Aug. 8, 1967  J. R. STEWART  3,334,367
AUTOMATIC SHOE HANDLING MEANS
Filed June 9, 1965  14 Sheets-Sheet 1

Inventor
James R. Stewart
By his Attorney
Scott K. Foster

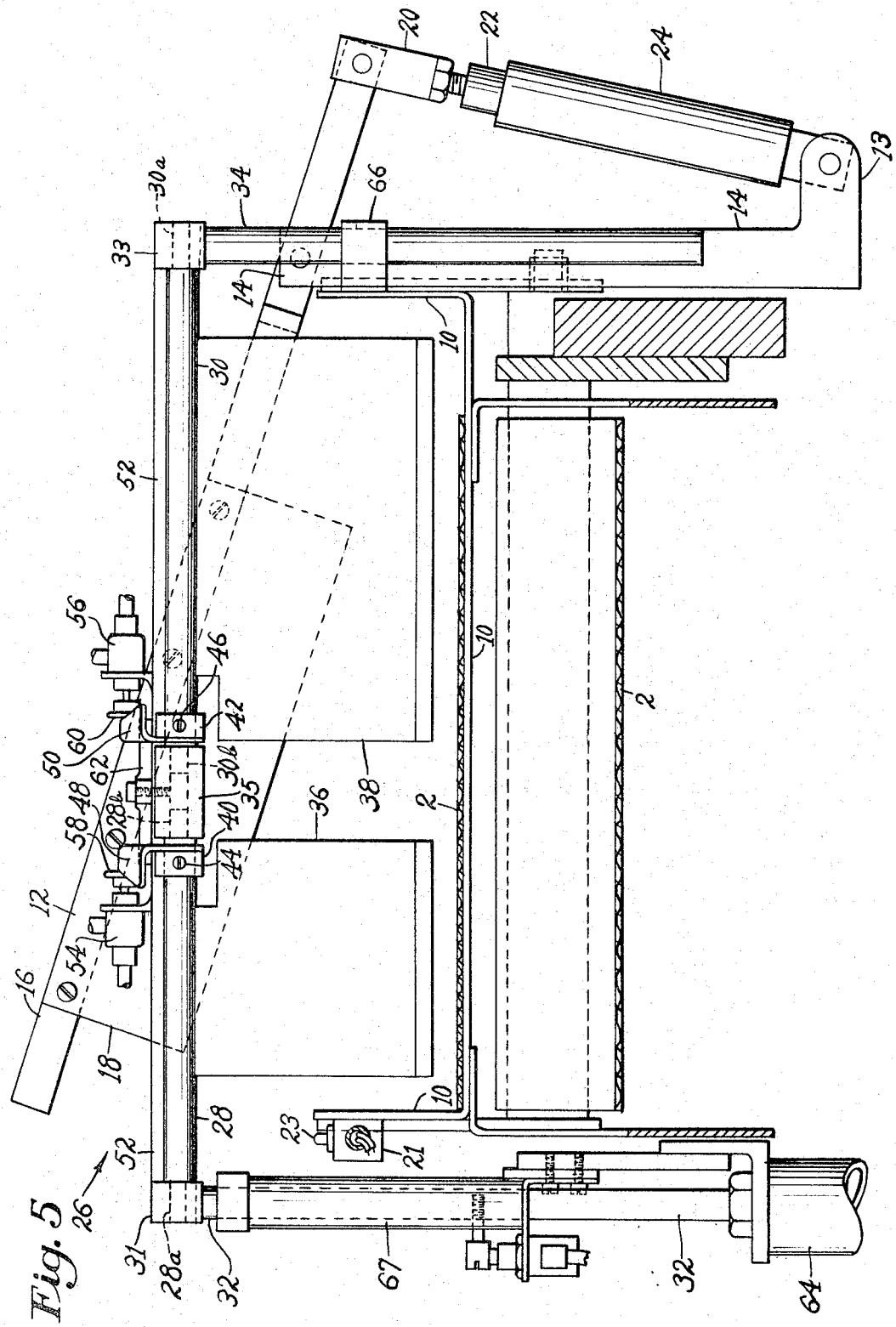

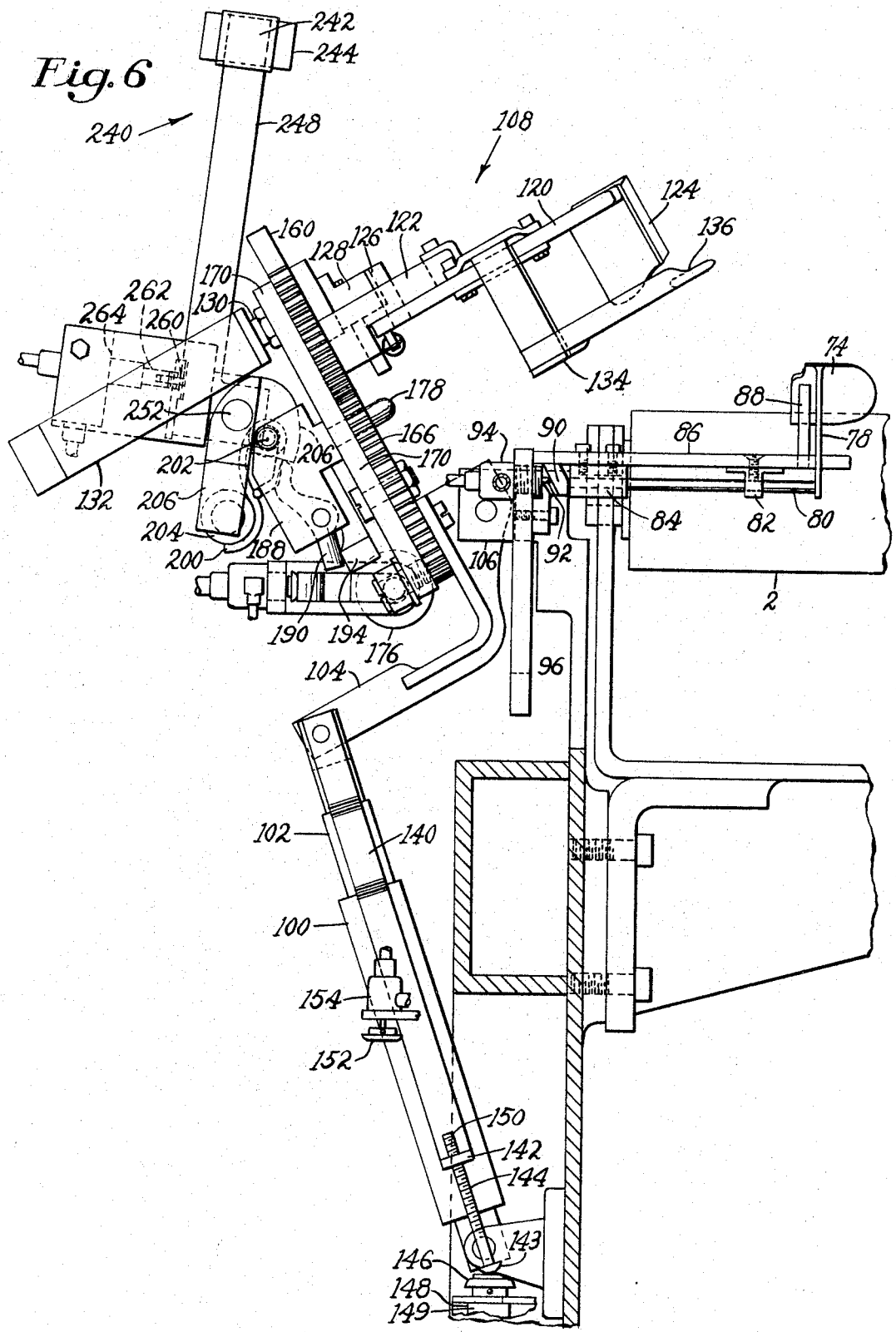

Aug. 8, 1967   J. R. STEWART   3,334,367
AUTOMATIC SHOE HANDLING MEANS
Filed June 9, 1965   14 Sheets-Sheet 7
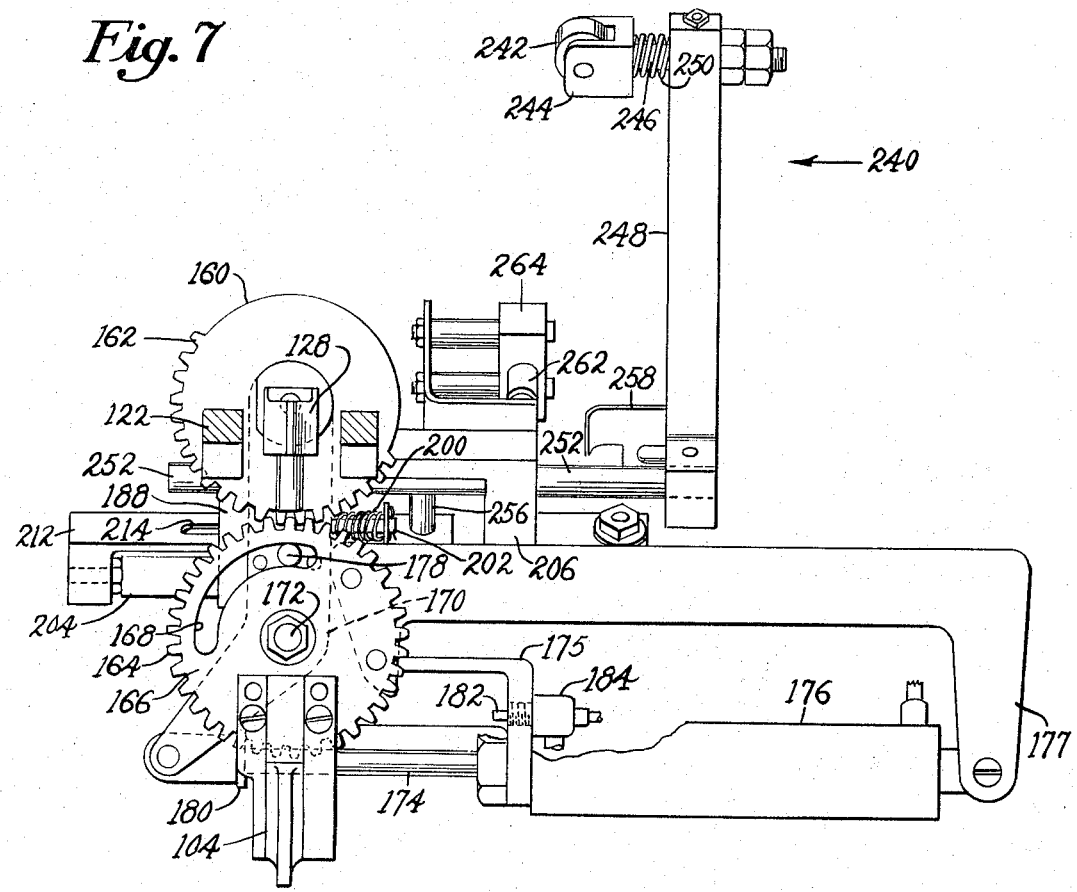
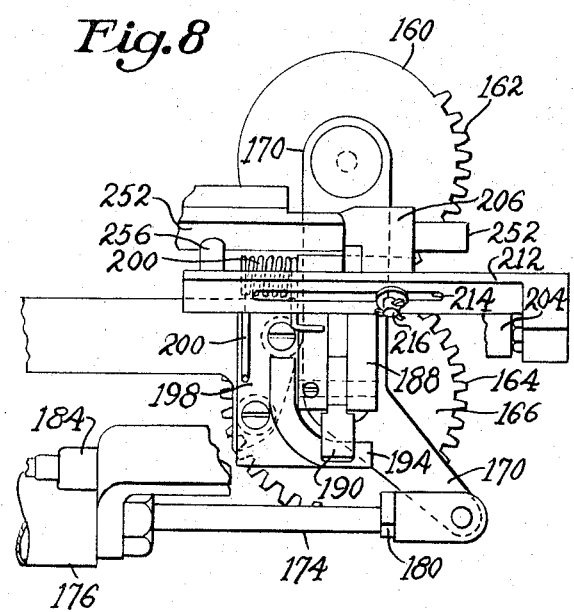
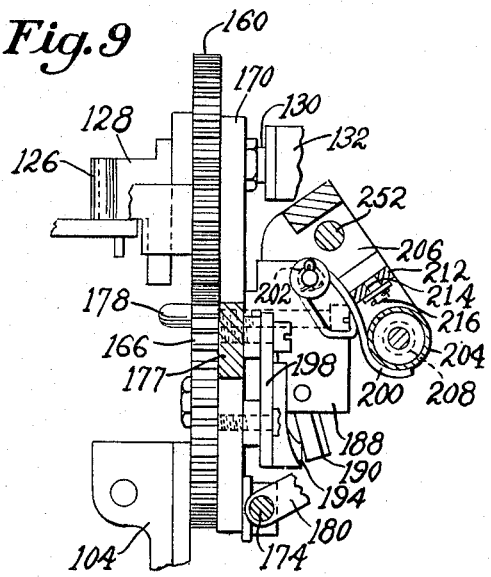

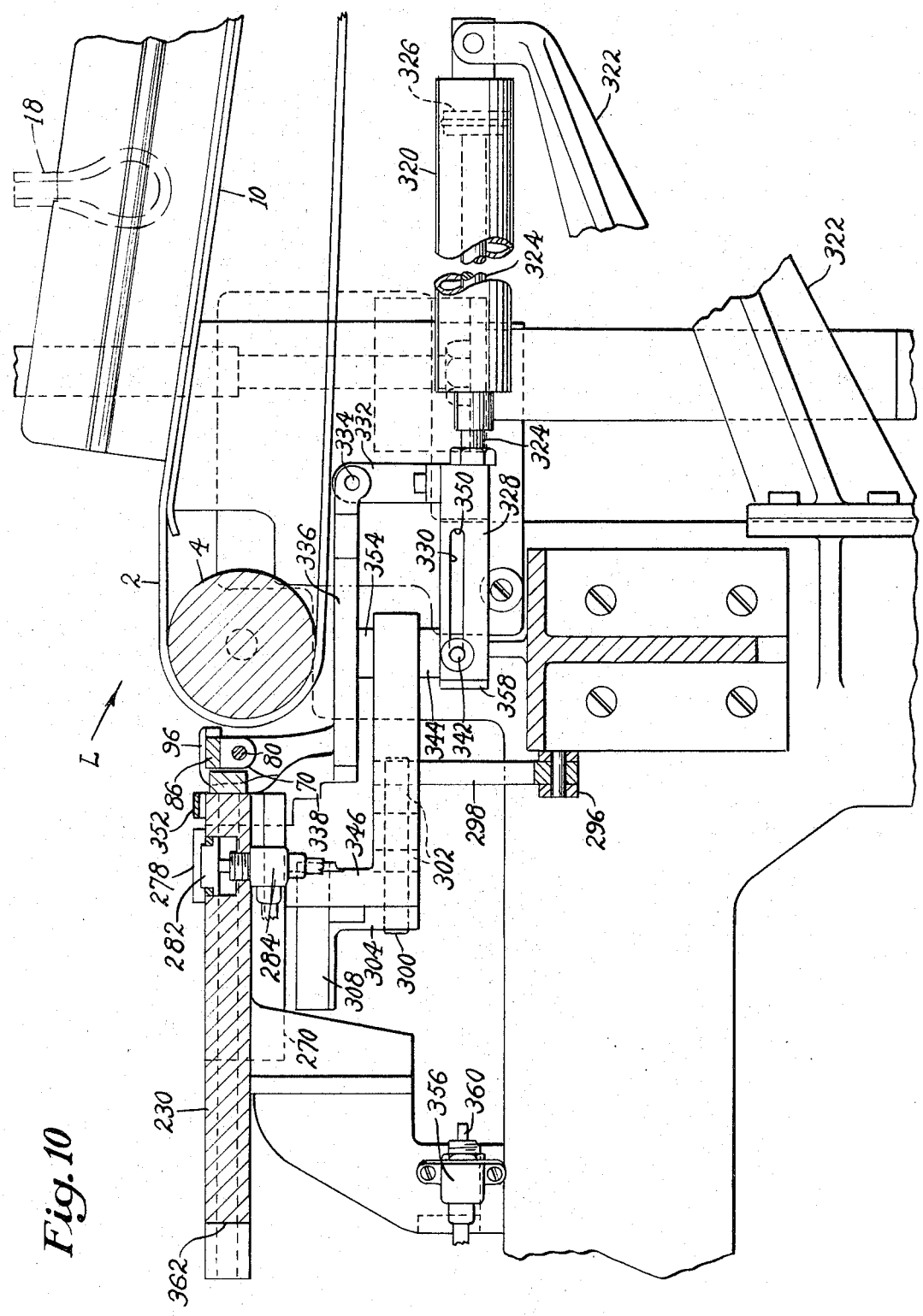

Aug. 8, 1967    J. R. STEWART    3,334,367
AUTOMATIC SHOE HANDLING MEANS
Filed June 9, 1965    14 Sheets-Sheet 10

Aug. 8, 1967   J. R. STEWART   3,334,367
AUTOMATIC SHOE HANDLING MEANS
Filed June 9, 1965

United States Patent Office 3,334,367
Patented Aug. 8, 1967

3,334,367
AUTOMATIC SHOE HANDLING MEANS
James R. Stewart, Salem, Mass., assignor to United Shoe Machinery Corporation, Flemington, N.J., and Boston, Mass., a corporation of New Jersey
Filed June 9, 1965, Ser. No. 462,659
20 Claims. (Cl. 12—1)

ABSTRACT OF THE DISCLOSURE

The present application is directed to an automatic shoe handling machine for use in the manufacture of shoes. The disclosed device delivers lasted shoes to a machine for automatically performing operations on the shoe, positions the shoe in the machine and removes the shoe from the machine for movement to a next station of operation.

---

This invention relates to shoe machinery and is directed more particularly to an automatic shoe handling means which delivers lasted shoes to a machine for performing automatic operations upon shoes. The shoe handling means positions the shoes for engagement by the machine, removes the shoes from the machine after they have been operated upon, and transports them away from the machine toward the next station in a shoemaking assembly line.

The invention is herein illustrated in its application to machines for attaching heels, of the type disclosed in United States patent application Ser. No. 354,259, filed Mar. 24, 1964, upon application of W. F. Mac-Kenzie, D. E. Ripley, A. W. Rockwell, Jr., and L. F. Stanton, now matured into Patent 3,249,278. While the device is herein illustrated in cooperation with a heel attaching machine, it is to be understood that many other machines might readily be employed in connection with the invention.

In the use of conventional machines for attaching heels to shoes mounted on geometrically graded lasts, which are usually made of wood and have steel positioning plates secured to their back cones and which are disclosed in United States Letters Patent No. 2,806,233, granted Sept. 17, 1957, on an application filed in the names of Arthur R. Hubbard et al., the shoes are manually presented to the machine by mounting the last upside-down on a spindle or jack. After the machine has performed its heel attaching function the operator manually removes the lasted shoe from the machine and places it in a conventional shoe rack which, when filled, may be wheeled to the next machine and workman in line.

Although various improvements have been effected in heel attaching machines and other shoemaking machines to diminish the skill required of an operator, there still exists the need of an operator for placing the shoes on the jack of the machine and for removal of the shoes from the machine. In addition, labor is required to wheel the shoe racks alongside and away from the workman tending the machine.

It is an object of the present invention to provide a device for delivering shoes to a heel attaching or like machine without the necessity of manual transporting. It is a further object of the invention to provide a device which will place the shoes so delivered in position for engagement with the jack of the shoe machine and remove the shoes from the jack after completion of the machine's operation. It is also an object of the invention to provide such a device that will, in addition, automatically transport the shoes removed from the jack of the machine to the next station in line.

With the above objects in view, the illustrative device comprises an endless belt for delivering the lasted shoes from the previous station to a shoemaking machine, stop means for stopping the movement of a shoe on the belt, gate means for admitting a shoe to a receiving station, gripper means for gripping the shoe in the receiving station and lifting it off the belt, means for inverting the shoe and placing it in position for engagement with the shoe machine jack, dump means responsive to the completion of the shoe machine's cycle of operation for removing the shoe from the jack and placing it right-side up at a discharge station, and endless belt means for moving the shoe from the discharge station to the next station in the shoe assembly line.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 5 is an elevational view of a portion of the shoe handling means showing the shoe stop means and gate assembly;

FIG. 6 is an elevational view showing the gripper positioning means and shoe push-down means;

FIG. 7 is a front elevational view showing in detail a portion of the shoe gripping and inverting means and the shoe push-down means;

FIG. 8 is a back detailed view of a portion of the shoe inverting means;

FIG. 9 is a side detailed view of a portion of the shoe inverting means;

FIG. 10 is a front elevational view, partly in section, taken along line X—X of FIG. 4;

Figure 1:
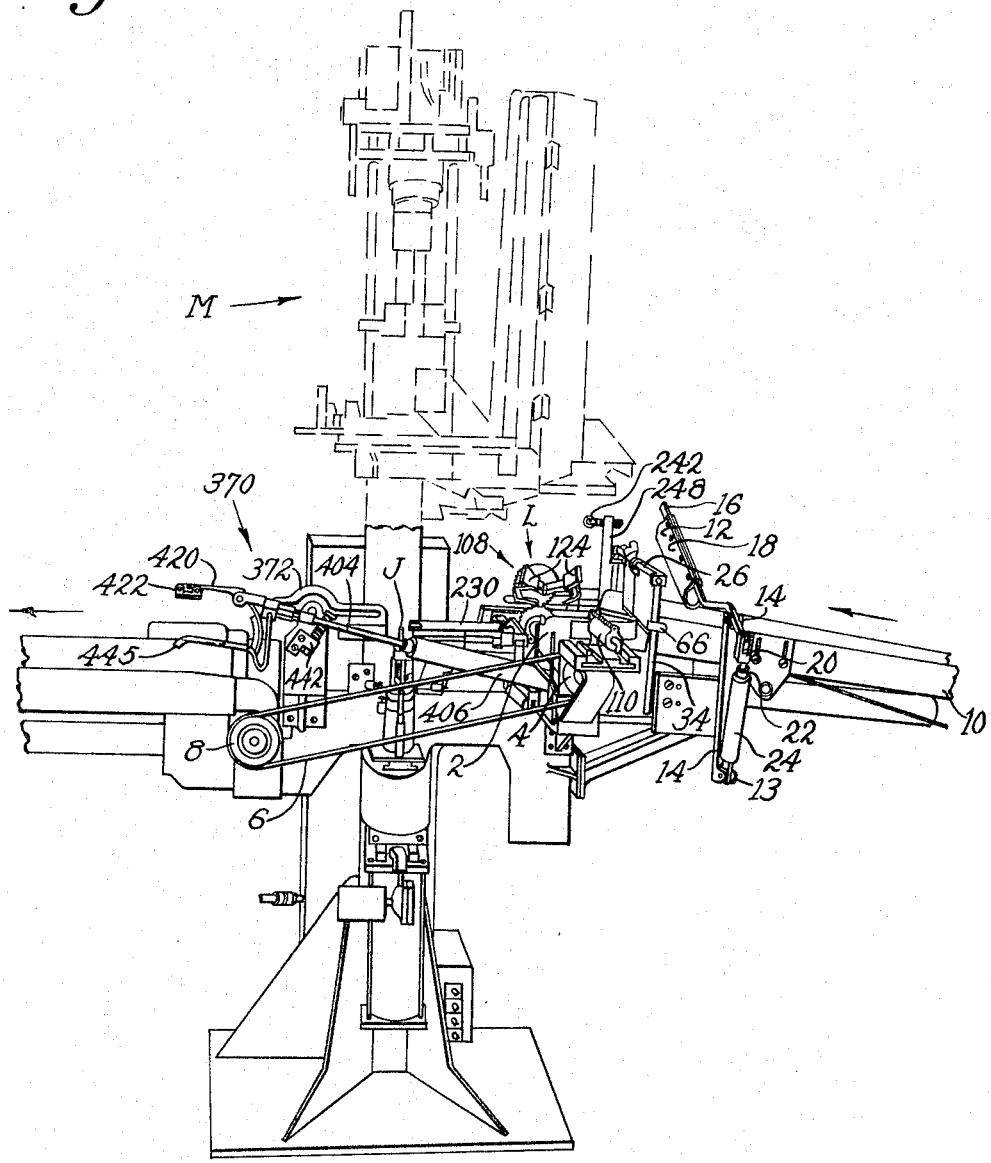
FIG. 1 is a perspective view of one form of automatic shoe handling means embodying the invention and showing a shoemaking machine, in this instance a heel attaching machine, in phantom.

Referring to the drawings, it may be seen that the invention contemplates the use of an endless belt 2 for delivering lasted shoe uppers 3 to a receiving station, generally designated L, in the vicinity of a shoemaking machine M. The delivery belt 2 is supported by a drive roll 4 and an idler roll (not shown), the drive roll 4 having mounted on one end a drive bolt belt 6 (FIGS. 1 and 2) which is also mounted on a roll 8 connected to an electric motor E. Thus, operation of the motor E causes the roll 8 to rotate, thereby rotating the drive roll 4 through the action of the drive belt 6. Rotation of the drive roll 4 causes movement of the delivery belt 2 so that the uppermost surface of the belt moves toward the shoemaking machine M over a runway 10, as indicated by directional arrows in FIGS. 1 through 3.

A stop member 12 is pivotally mounted on a frame member 14 for the purpose of permitting but one shoe at a time to be advanced to the machine M. To this end the stop member 12 extends across the delivery belt 2 so as to stop the movement of a shoe on the belt. The stop member 12 comprises a bar 16 having attached thereto a buffer member 18 which may be rubber, leather, or the like. An upper moving toward the machine M on the upper surface of the belt 2 engages the buffer member 18, when that member is in the "down" position, which is sufficiently soft and pliable to prevent marking of the upper. Referring to FIG. 5, it will be seen that the bar 16, in addition to being pivotally connected to the frame member 14, is also pivotally attached to a bifurcated link 20 which is attached to a stop cylinder piston rod 22 received in a stop cylinder 24. The stop cylinder 24 is pivotally mounted in a bifurcated portion 13 of the frame member 14. When the piston rod 22 is drawn into the cylinder 24 the bar 16 pivots so as to remove the buffer member 18 from its shoe stop position and elevate it, as shown in FIGS. 1 and 5, above the belt and in a non-obstructing position. Conversely, energizing the cylinder 24 so as to extend the piston rod 22 therefrom causes the stop member 12 to assume a shoe stopping position across the delivery belt 2. A lift valve 21 (FIGS. 2 and 5) has a plunger 23 (FIG. 2) which is engaged by the bar 16 when the piston rod 22 is extended from the stop cylinder 24. Actuation of the valve 21 energizes a gate assembly to be described below.

On the machine side of the stop member 12 there is a gate assembly 26 for regulating the attitude of the shoe before it is allowed to pass to a receiving station L. The gate assembly 26 includes a pair of swing bars 28, 30 in tandem (FIG. 5) disposed across the belt 2 and having reduced ends 28a, 30a rotatably supported by bearing blocks 31, 33 mounted on upright posts 32, 34. A bearing block 35 receives reduced ends 28b, 30b of the bars 28, 30 and thereby interconnects the bars on which are rigidly attached swing plates 36, 38. A pair of collars 40, 42 are fixed to the opposing ends of the swing bars 28, 30 by set screws 44, 46. Cams 48, 50 are connected to each collar respectively. A brace member 52 extends from one upright post 32 to the other post 34 and has mounted thereon a pair of air switches 54, 56, each having a plunger 58, 60 in engagement with one of the cams 48, 50. In addition, the brace 52 has fixed thereon a stop member 62 engageable by the cams 48, 50. The posts 32, 34 are vertically movable, the post 32 being a piston in a gate lift cylinder 64, and being slidably retained by a bearing member 67 (FIG. 5), and the post 34 being slidably retained in a bracket member 66. A shoe approaching the machine M on the belt 2 passes beneath the upraised stop member 12 and into engagement with one of the plates 36, 38, depending on the position of the shoe on the belt 2. The shoes are initially placed on the belt 2 with their heels toward the rear edge of the belt (to the left, as shown in FIG. 3). When several shoes are thus placed on the belt and when they contact each other side by side, the shoes tend to "angle around" the heels, because of the narrower width of the heels compared to the width of the forepart portions. In order to illustrate the working of the shoe attitude regulating assembly there will be described as an example the reaction of the assembly to a shoe reaching the swing plates 36, 38 angled in a toe first attitude. In such an attitude the toe portion of the traveling shoe strikes the plate 38 before the heel portion engages the plate 36. When the plate 38 is engaged by the moving shoe it tends to swing toward the machine, or to the left as viewed in FIG. 1, causing the bar 30, which is fixed to the plate 38, to rotate in the bearings 33 and 35. The collar 42, attached to the bar 30, rotates with the bar 30 and causes the cam 50 to move to the right as viewed in FIG. 2. The cam 50 is thereby caused to bear against the plunger 60 forcing the plunger 60 into the switch 56. The stop 62 prevents movement of the cam other than is necessary to actuate the switch 56. In stopping the movement of the cam 50 the stop 62 also prevents further movement of the plate 38, so that the toe portion of the shoe is prevented from moving closer to the machine M. The belt 2 continues to move toward the machine M so that in short order the heel of the shoe "catches up" with the toe and engages the plate 36, causing the bar 28 to rotate and the cam 48 to operate the switch 54 in the same manner as the cam 50 operated the switch 56. The stop 62 prevents the plate 36 from swinging far enough to permit the shoe to pass. At this point the shoe to be operated upon is at an attitude in which its center line is substantially normal to the direction of movement of the belt. When both the switches 54 and 56 have been actuated by the cams 48, 50 respectively, the gate lift cylinder 64 is actuated by means described below so as to cause the post 32 to be extended from the lift cylinder 64, thereby raising the gate assembly 26 to allow the shoe to pass thereunder. Prior to the raising of the gate assembly, the stop cylinder 24 is actuated so as to lower the stop assembly 12, thereby obstructing the passage of another shoe.

Passing under the upraised gate assembly 26, the shoe reaches the receiving station L from which the shoe is automatically picked up and submitted to the machine M.

The receiving station L is provided with a pair of fingers 70, 72 and a plate 74 (FIG. 4) which combine to stop the movement of the shoe at the downstream end of the delivery belt 2. The fingers 70, 72 are fixed to a frame member 76. The plate 74 has a backing portion 78 which is attached to one end of a cam rod 80 (FIG. 6) rotatably retained by bearing members 82, 84. The bearing members 82, 84 are secured to a bracket 86 to which there is also fixed a stop member 88. The extent of the rotation of the cam rod 80 is limited by the stop 88 which is engaged by the plate 74. At the other end of the cam rod 80 there is fixed a cam 90 which is in contact with a plunger 92 disposed in a start switch 94 mounted in a frame member 96. Upon reaching the receiving station L, the shoe continues to move on the belt 2 until it engages the fingers 70, 72 and the plate 74. When the plate 74 is engaged by the shoe, the rod 80 rotates in the bearings 82, 84 until the plate 74 engages the stop 88. As the rod 80 rotates, the cam 90 rotates with it and pushes the plunger 92 into the start switch 94. Depression of the plunger 92 actuates the switch 94 which actuates a gripper means.

Included in the gripper means is a gripper positioning cylinder 100 (FIG. 6) having a gripper positioning piston rod 102 extending therefrom. The free end of the piston rod 102 is fixed to a gripper bracket 104 which is pivotally mounted on a frame member 106. Extension of the piston rod 102 causes the gripper bracket 104 to pivot on the frame member 106. The gripper bracket 104 supports a gripper assembly 108 which has means for gripping the heel end of a shoe. Thus, actuation of the switch 94 causes actuation of the gripper positioning cylinder 100 so as to extend the piston rod 102 and thereby pivot the gripper bracket 104 and the gripper assembly 108 about the frame member 106. Such pivotal movement causes the gripper assembly 108 to move from a position as shown in FIG. 6 to a position at shoe level, shown in FIG. 3.

For the purpose of presenting the shoe to the gripper assembly the machine is provided with a toe pusher cylinder 110 (FIGS. 2 and 4) mounted on a bracket 112 which is fixed to the frame member 76. The cylinder 110 is provided with a pusher cylinder piston rod 114 which on its free end carries a toe plate 116 (FIGS. 3 and 4). The piston rod 114 is urged into the cylinder 110 by a pusher cylinder spring 118. The toe pusher cylinder 110 is caused, by means to be described herein below, to extend its piston rod 114 and thereby the toe plate 116 against the influence of the spring 118. The toe plate 116 engages the toe of the shoe S and pushes the shoe widthwise of the belt 2 toward and into the gripper assembly 108.

Figure 2:
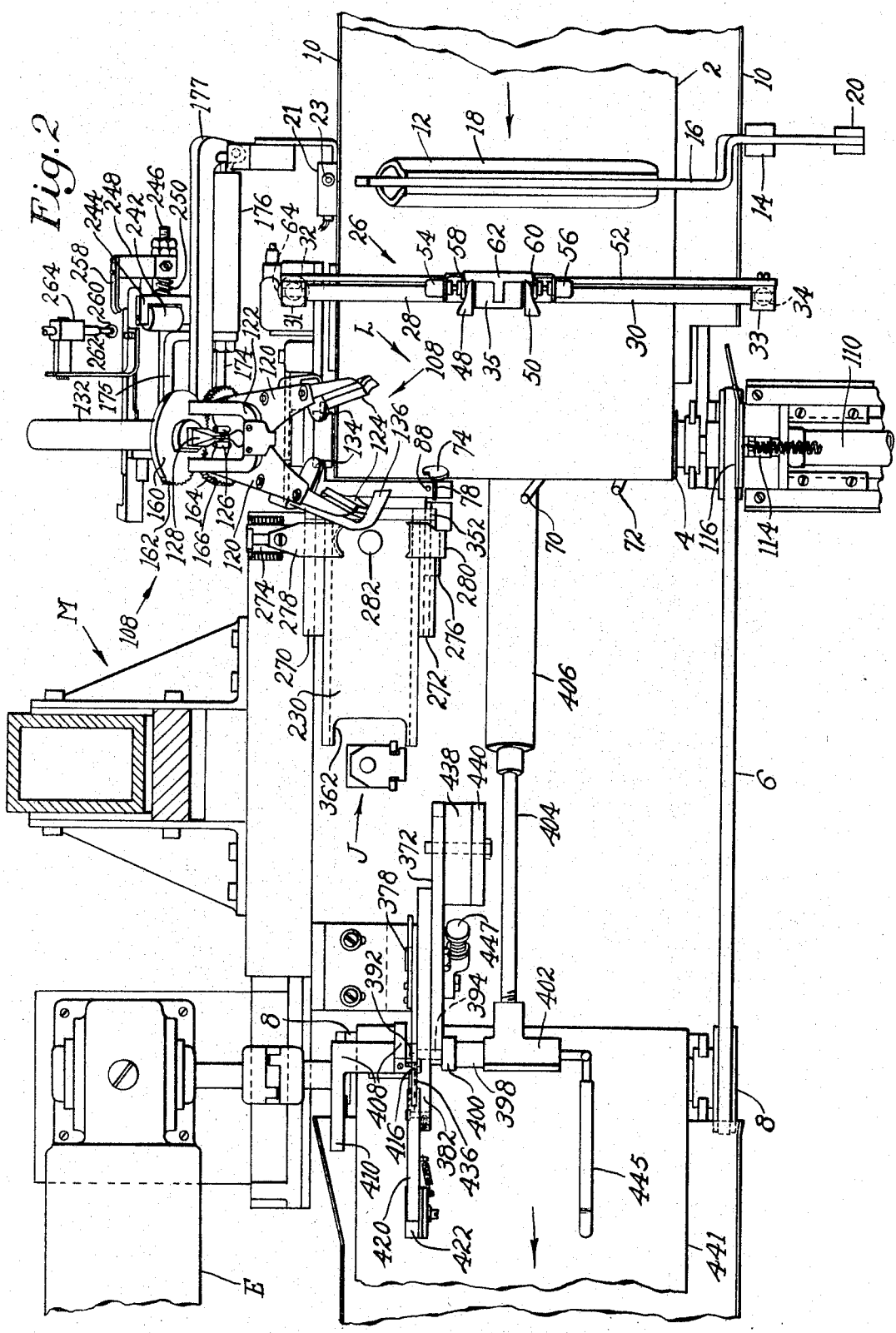
FIG. 2 is a plan view.
Figure 3:
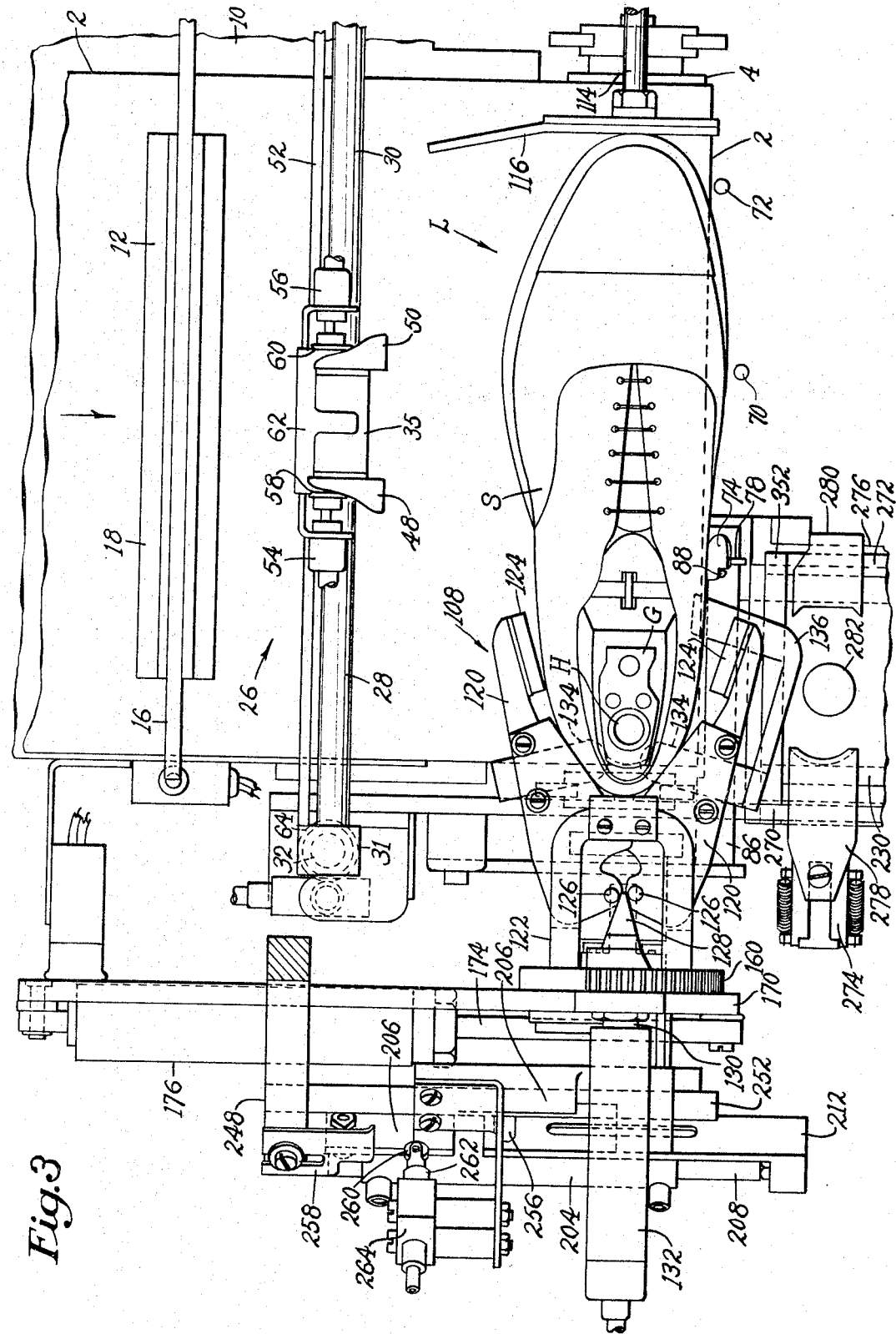
FIG. 3 is a plan view of a portion of the shoe handling means showing in particular the receiving station and gripping means.
Figure 4:
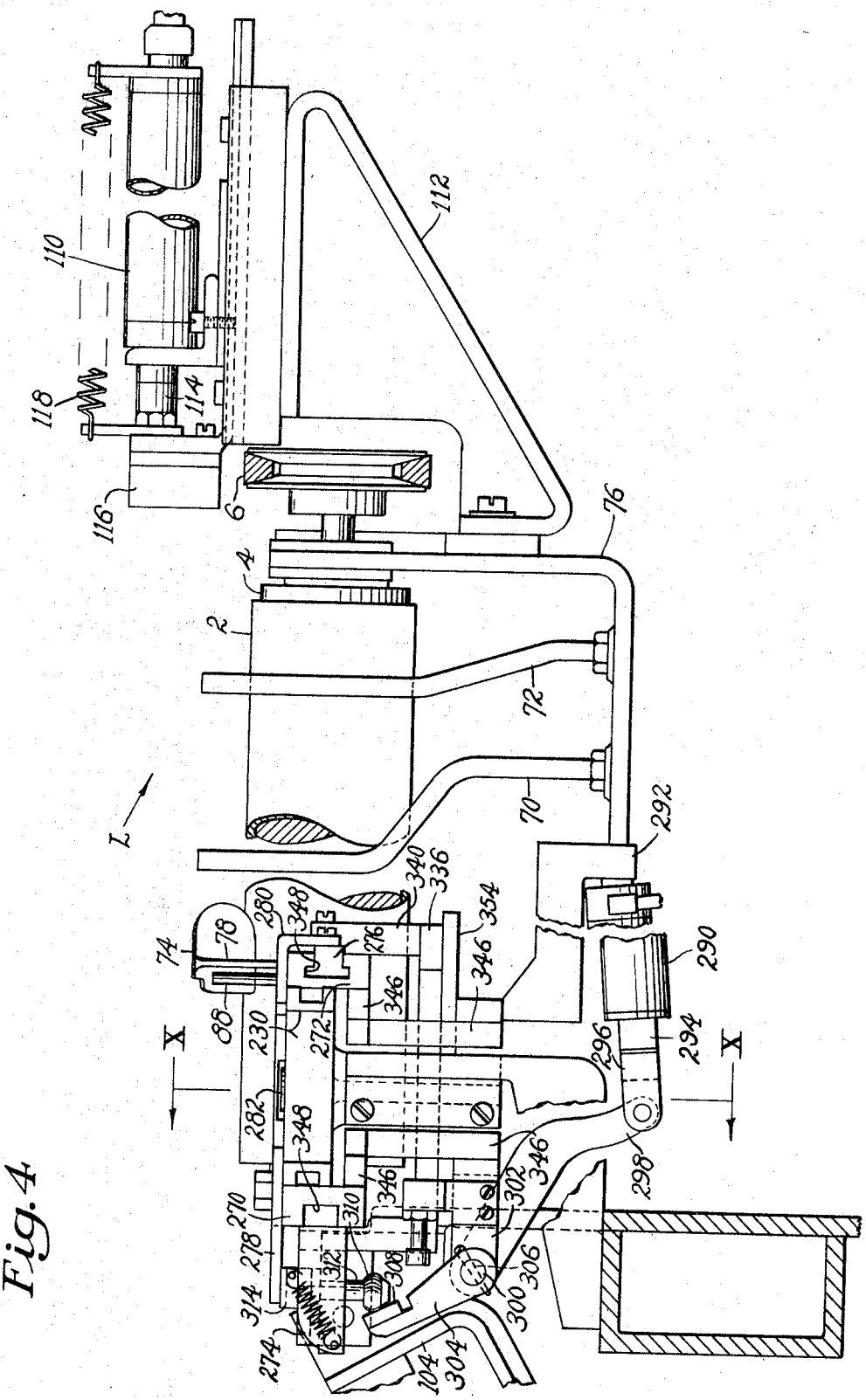
FIG. 4 is an elevational view of the downstream end of the delivery belt.

The gripper assembly 108 includes a pair of spring biased gripper jaws 120 pivotally connected to a U-shaped member 122 (FIGS. 2 and 3). The gripper jaws 120 each have at their forward ends pads 124 for engaging the heel portion of a lasted upper. At their rearward ends the gripper jaws have upstanding pins 126 which are engageable with a wedgelike cam 128 mounted on one end of a piston rod 130 operatively disposed in a gripper closing cylinder 132. Also attached to each gripper jaw is a fluke 134 for fitting beneath the shoe. In addition, an extended finger 136 is attached to one gripper jaw and supports the shoe from beneath forwardly of the heel to prevent the dropping of the toe of the shoe when it is lifted. When the heel of the shoe is pushed well into the gripper assembly, the gripper closing cylinder 132 extends its piston rod 130 and the cam 128. The cam 128 advances between the pins 126, forcing the pins 126 against spring pressure to separate and thereby causing the gripper jaws 120 to close upon the heel portion of the shoe and the flukes 134 to move under the shoe. The gripper positioning cylinder 100 then draws in its piston rod 102 thereby causing the gripper assembly to be raised, as shown in FIG. 6, but with the shoe held between the gripper jaws.

Pivotally mounted on the gripper bracket 104 and the free end of the piston rod 102 (FIG. 6) is a switch actuating rod 140 having at its lower end a flange 142 which receives a screw 144. When the piston rod 102 is drawn into the cylinder 100, as shown in FIG. 6, the head 143 of the screw 144 engages a plunger 146 which operates two air switches, or valves, 148, 149 on the machine. When the piston rod 102 is extended, the other end 150 of the screw 144 engages a plunger 152 of another switch 154. The operation of the switches 148, 149, 154 will be described in conjunction with the pneumatic circuit hereinbelow.

For the purpose of inverting the shoe the U-shaped member 122 is mounted on a disc 160 which has along a portion of its periphery gear teeth 162. The teeth 162 engage teeth 164 of a second disc 166 which is stationary and which has an arcuate slot 168 (FIG. 7). Both discs 160, 166 are mounted on a lever 170 which is pivotally mounted at the center 172 of the disc 166 and which at one end is attached to the free end of a piston rod 174 disposed in an inverter cylinder 176 held by frame members 175 and 177. The lever 170 has mounted thereon a pin 178 which is disposed in the slot 168 of the disc 166. After the gripper assembly has elevated the shoe to the raised position, as described above, the cylinder 176 draws in the piston rod 174, causing the lever 170 to pivot about the point 172. The disc 160, rotatably mounted on the free end of the lever 170 "walks around" the toothed periphery of the disc 166, the pin 178 travelling in the slot 168. As the disc 160 rotates, and moves arcuately, so does the U-shaped member 122 and thereby the gripper assembly 108 with the shoe S. The lever 170 pivots about the point 172 until a lug 180 (FIGS. 7-9) fixed to the piston rod 174 engages the plunger 182 of a valve 184 which is retained by the frame member 175. Referring to FIGS. 6-9, the pin 178 is an extension of the lever 170 which is attached to a block 188. A lug 190 is pivotally attached to the block 188. A cam member 194 is secured to a plate 198 (FIG. 9) which is fastened to the frame member 177. The cam member 194 is engaged by the lug 190. A spring 200 is retained on a rod 202 mounted on the block 188 and engages a push down cylinder 204 mounted on a bracket 206. The spring 200 exercises an influence on the bracket 206 which engages the lug 190 (FIG. 6), urging the lug 190 to maintain engagement with the cam 194 as the lug 190 moves arcuately with the block 188 and lever 170 for purposes described below.

The machine is provided with a table 230 (FIGS. 2, 3, 4) for receiving the shoe thus removed from the belt and inverted. For urging the shoe into firm engagement with the table 230 there is provided a push-down assembly 240 (FIGS. 6 and 7) comprising a roller 242 rotatably mounted in a bifurcated member 244 which is disposed on a rod 246 slidably carried by one end of a push-down arm 248. A coil spring 250 is located about the rod 246 and between the member 244 and the arm 248 so that the member 244 and the rod 246 are yieldably retained relatively to the arm 248 in the position shown in FIG. 7. The arm 248 is mounted at one end on a shaft 252 (FIGS. 6 and 7) retained by the bracket 206. The shaft 252 is connected by an interconnecting pin 256 (FIGS. 7 and 8) to a push-down link 212 having a slot 214 in which is disposed a pin 216 extending from the bracket 206. When the lever 170 rotates about the pin 172, the block 188 moves with it and carries the bracket 206, the shaft 252, the push-down cylinder link 212, and the push-down cylinder 204. As the shaft 252 moves it carries the push-down arm 248 with it to position the roller 242 immediately above the upwardly facing sole of the shoe. The cam 194 causes the arm to turn to the correct shoe-engaging attitude.

The push-down cylinder 204 is then actuated to extend its piston rod 208. The free end of the piston rod 208 is fixed to the link 212 so that as the rod is extended the push-down link moves with it, the slot 214 moving on the pin 216. As the push-down link 212 moves it carries with it, through the interconnecting pin 256, the shaft 252 and the push-down arm 248. Accordingly, the push-down roller 242 is caused to engage the sole of the shoe and firmly press the shoe downward into contact with the table 230. The push-down arm 248 carries a contact plate 258 (FIGS. 2, 3 and 7) which, upon movement of the arm 248 into push-down position, engages a roller 260 (FIG. 3) disposed on a plunger 262 connected to a valve 264, the purpose of which will be discussed below.

As mentioned heretofore, the last on which the upper is mounted is equipped with a geometric last plate G, well known in the art. In the plate G and last there is a thimble H for receiving the spindle of a jack of a shoemaking machine.

The table 230 (FIGS. 2, 3, 4 and 10) has slidably mounted thereon a pair of side members 270, 272 which, in turn, have slidably mounted thereon clamp slide members 274, 276 which have attached thereto a pair of opposed clamps 278, 280, respectively, which cooperate to securely hold the shoe and transport it to a jack engaging position. The table 230 is also provided with a button 282 for actuating a valve 284 (FIG. 10). When the gripper and inverter means have completed their functions, the shoe rests upside down on the table 230, with the geometric plate G engaging the button 282. The push-down means, described above, insures firm engagement of the geometric plate G and the table 230.

Referring to FIGS. 4 and 10, when the button 282 is depressed by the plate G the valve 284 is actuated. Actuation of the valve 284 causes a clamp cylinder 290 (FIG. 4) attached to a frame member 292 to extend its piston rod 294. A link 296 is fixed to the free end of the rod 294 and has pivotally attached thereto one end of a link 298. The other end of the link 298 is fitted on a pin 300 held by a frame member 302. One end of an arm 304 is also fitted on the pin 300 and is connected to the link 298 by a connecting pin 306. The other end of the arm 304 carries a face plate 308 which is engageable with a roller 310 mounted on a shaft 312 retained by a spring biased clamp mounting block 314 slidably disposed in the clamp slide member 274. When the piston rod 294 is extended the link 298 and arm 304 pivot as one member about the pin 300, causing the face plate 308 to engage the roller 310 of the shaft 312, thereby causing movement of the clamp mounting block 314 in the clamp side member 274. The block 314 moves to the right as viewed in FIG. 4 to firmly clamp the last plate G between the two clamps 278, 280. The clamp 280 remains stationary during the clamping operation. The gripper assembly 108 releases the shoe and returns to the receiving station.

Figure 11:
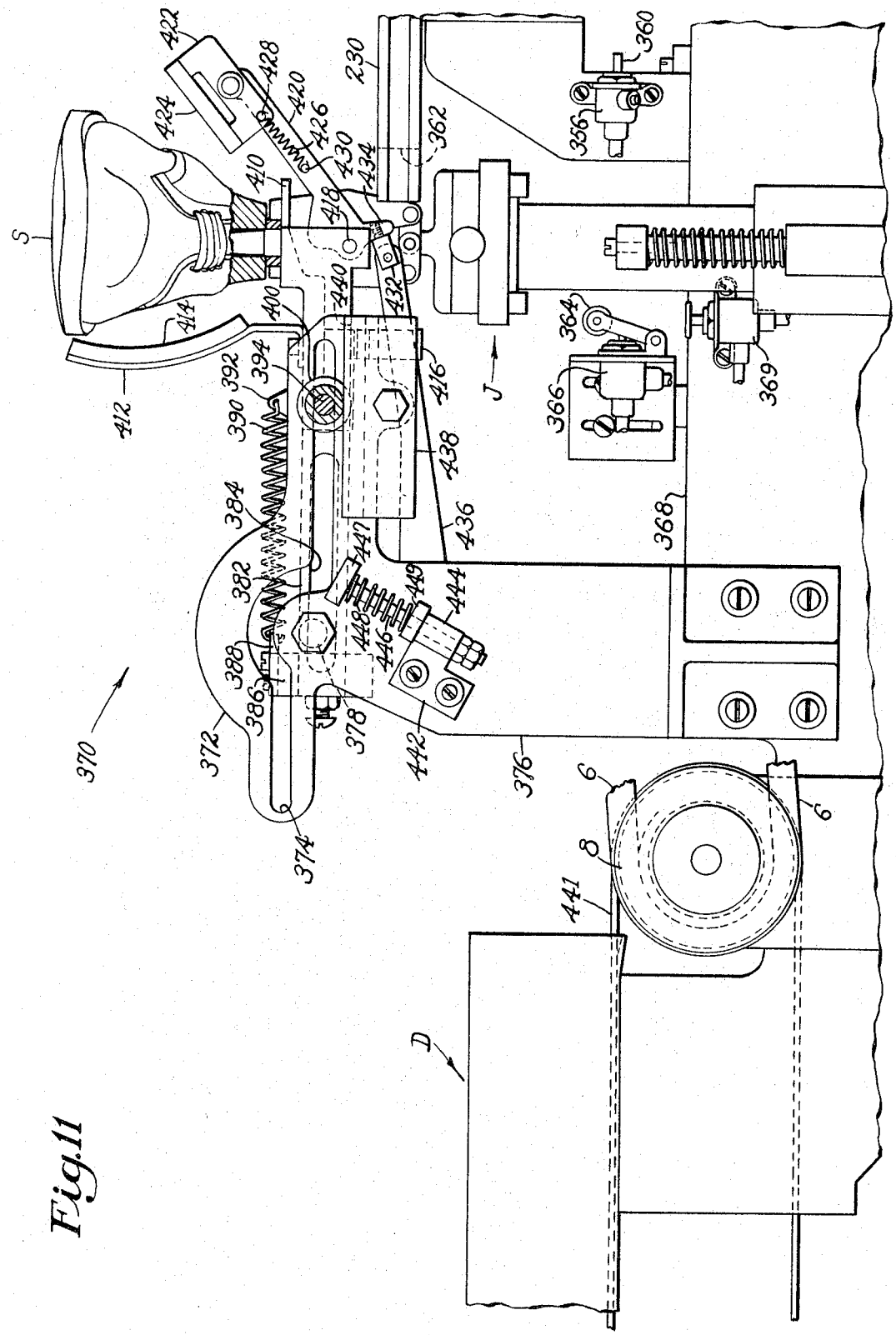
FIG. 11 is a front elevational view of the shoe dump means.

In order to move the shoe into position for mounting on the spindle of the machine M, there is provided a traverse cylinder 320 (FIG. 10) pivotally retained at one end by a frame member 322. A piston rod 324 extends from a piston 326 in the traverse cylinder 320 and has fixed to its free end a traverse link 328 having a lost motion slot 330. Rigidly attached to the link 328 is a bifurcated member 332 which retains a pin 334 which supports a U-shaped member 336. Secured to the ends of the U-shaped member 336 are side clamp link members 338 (FIG. 10), 340 (FIG. 4). The side clamp link members 338, 340 are connected to the clamp slide members 274, 276, respectively. Thus, movement of the piston rod 324 is transmitted to the clamp slide members 274, 276. Received in the slot 330 of the traverse link 328 is a pin 342 mounted on a link 344. Fixed to the link 344 is a side member bracket 346 which is bifurcated and which is connected to the side members 270, 272. Accordingly, when the piston rod 324 is extended, the clamp slide members 274, 276 (FIG. 4) are moved to the left, as viewed in FIG. 10, sliding in grooves 348 in the side members 270, 272 which remain stationary until the trailing edge 350 of the slot 330 engages the pin 342. Thereupon, the link 344 is moved leftward, as seen in FIG. 10, and carries the side member bracket 346, and thereby the side members 274, 276 with it. Thus, the side members 270, 272 and the clamp slide members 274, 276 are moved together after the length of the lost motion slot has been traveled by the piston rod 324. A bar 352 interconnects the side members. A support plate 354 is fixed to the side member bracket 346 and affords sliding support for the U-shaped member 336. A valve 356 having a plunger 360 (FIG. 10) is actuated by a face plate 358 attached to the traverse link 328 when that link has traveled a distance sufficient to place the shoe in position to receive a vertically movable shoe machine jack J. The table 230 has a recess 362 (FIG. 10) for receiving the jack J of a shoe making machine (FIG. 11). Engagement of the plunger 360 of the switch 356 by the face plate 358 of the link 328 signals the jack of the shoe making machine to elevate, whereupon the jack engages the thimble H of the last plate G and carries the lasted upper S into operative position in the shoe making machine. As the jack elevates, it contacts a roller 364 mounted to actuate a switch 366 mounted on a frame member 368. Also mounted on the frame member 368 is another switch 369 which is actuated by the lowering of the jack after completion of the shoemaking operation of the machine M.

Figure 12:
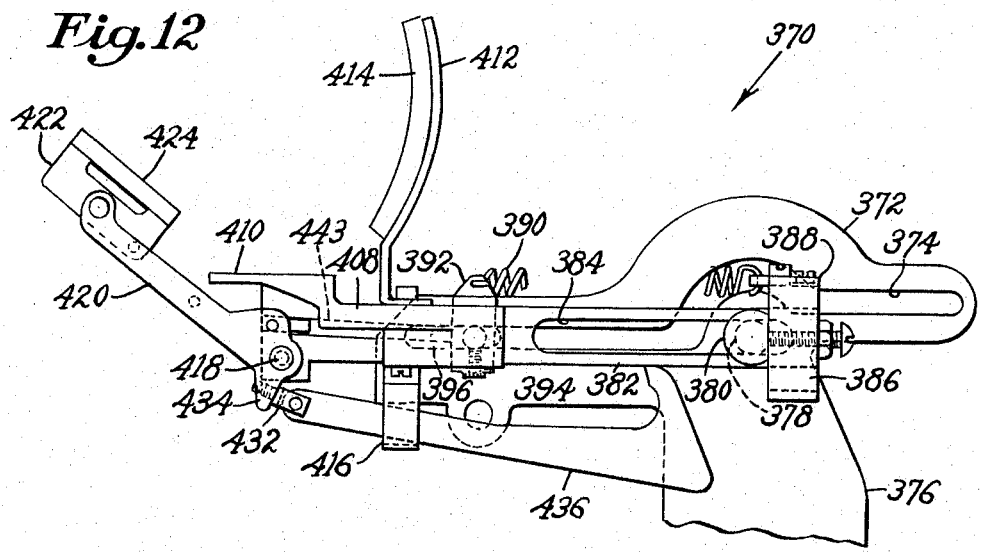
FIGS. 12 and 13 are back elevational views of the shoe dump means showing the dump means in different phases of its cycle of operation.
Figure 13:
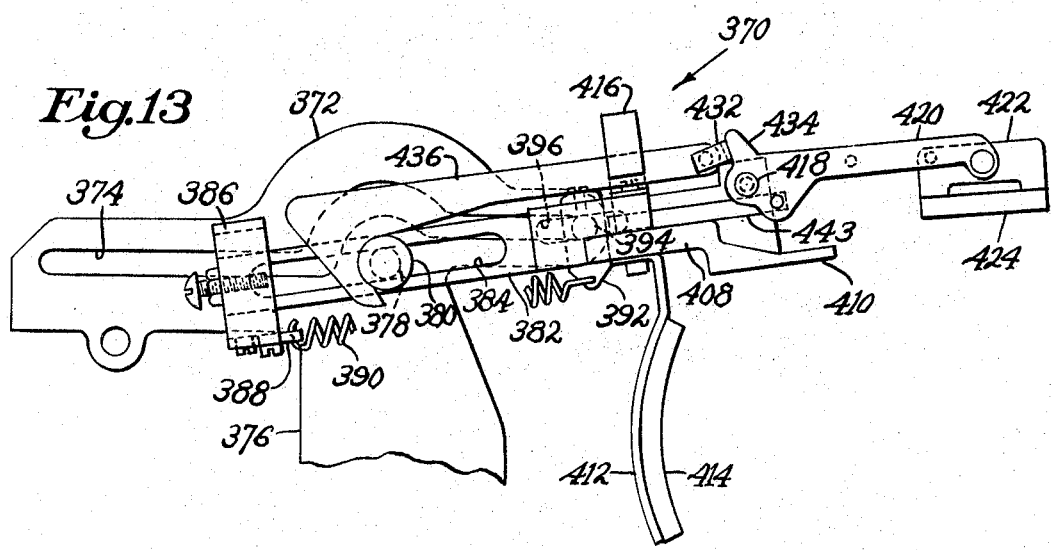

For the purpose of removing the shoe from the jack after completion of the shoe machine operation, the device is provided with a shoe dump means, designated generally by numeral 370. Referring to FIGS. 11–13, the dump means includes a dump cam 372 having a slot 374. The cam 372 comprises the upper end of a member 376 secured to the frame member 368. Mounted on the back face (FIGS. 12 and 13) of the cam 372 is a spool 378 having a flange 380. A link 382 having a slot 384 is slidably mounted on the spool 378. The link 382 has at one end a block 386 with a lug 388 attached thereto. The lug 388 receives one end of a coil spring 390 the other end of which is fastened to a block 392. The block 392 has as an integral part thereof a pin 394 which extends through a second slot 396 in the link 382 and connects with a spool 398 (FIG. 2) having a collar 400. The spool 398 is received in a T-block 402 which is connected to a dump cylinder piston rod 404 extending from a dump cylinder 406 pivotally connected to a frame member (not shown). Integral with the link 382 is a side member 408 having a plate portion 410 for receiving the last plate G. Fixed to the link 382 is a leaf spring 412 on which is secured a resilient pad 414 for engaging the shoe. Pivotally connected by a pin 418 to one end of the link 382 is an end member 420 on which is pivotally mounted a block 422 having a resilient pad face 424. A tension spring 426 (FIG. 11) interconnects a pin 428 on the block 422 and a pin 430 on the end member 420 for the purpose of yieldingly holding the block 422 in position to engage the shoe with the face 424. A bifurcated link member 432 is fixed to a lug 434 on the end member 420 and mounts for swinging movement a hook member 436 which is free at its hook end. Fixed to the dump cam 372 is a support block 438 which has a runway 440 (FIG. 2) on which rides the collar member 400. Fixed to the member 376 is a bracket 442 (FIG. 11) having a cylinder 444 which receives a pin 446 having a head 447. A spring 448 is disposed between the head 447 and a flange 449 on the cylinder 444, the spring 448 being further disposed about the pin 446 so that the head 447 is urged upwardly, as viewed in FIG. 11. A rigid wire 445 extends from the T-block 402 for the purpose of supporting the toe of the shoe.

While the jack J is in the raised position the dump cylinder 406 operates to draw in the piston rod 404. This movement is transmitted through the T-block 402 to the dump means 370 to place it in position, as shown in FIGS. 11 and 12. After the shoe machine M has completed its operation upon the shoe the jack is lowered back to the position shown in FIG. 11. As the jack lowers, the shoe is intercepted by the plate 410 and the wire 445 which cooperate to hold the shoe. When the jack approaches its down position it engages the valve 369 which causes the dump cylinder 406 to extend its piston rod 404. As the rod 404 is extended the T-block 402, the wire 445, the link 382, the block 392 and the side member 408, including the plate 410, move to the left as viewed in FIGS. 2 and 11, the pin 394 riding in the slot 374 of the cam 372, and the collar 400 riding in the runway 440 of the support block 438. Referring to FIG. 11, as the block 392 and link 382 move leftward with the pin 394 in the slot 374, the leaf spring 412 and the end member 420, now carrying an inverted shoe therebetween, move leftward, the last plate resting on the plate 410. As the spool 398 reaches the upwardly extending curve in the cam slot 374 it "bounces off" the spring biased head 447, affording the spool 398 impetus upwardly to follow the cam slot 374. While the link 382 moves leftward its slot 384 rides about the stationary spool 378. As the pin 394 rides in the cam slot 374 it causes the link 382 and its associated members to move from a position shown in FIG. 12 to a position illustrated in FIG. 13. The spring 390 urges the block 392 to move in the slot 396 toward the block 386. The block 392 and the end member 420 are interconnected by a rod 443 so that the influence of the spring 390 is transmitted to the end member 420 to effect a secure shoe holding pressure during the operation of the dump means. When the dump assembly approaches the position shown in FIG. 13, the hook member 436, which has been resting loosely in the catch 416 falls under the force of gravity to engage the spool 378.

After the hook member 436 has engaged the spool 378, further movement of the link member 382 causes the end member 420 to be pivoted counterclockwise, as viewed in FIG. 13, about the pin 418, against the influence of the spring 390. Such movement of the end member 420 causes the block 422 to release the shoe, thereby permitting the shoe to fall by gravity onto a discharge station D comprising the upstream end of an endless conveyor belt 441. The conveyor belt 441 may comprise the delivery belt of another automatic shoemaking machine or may deliver the shoes to a storage area, as desired.

Figure 22:
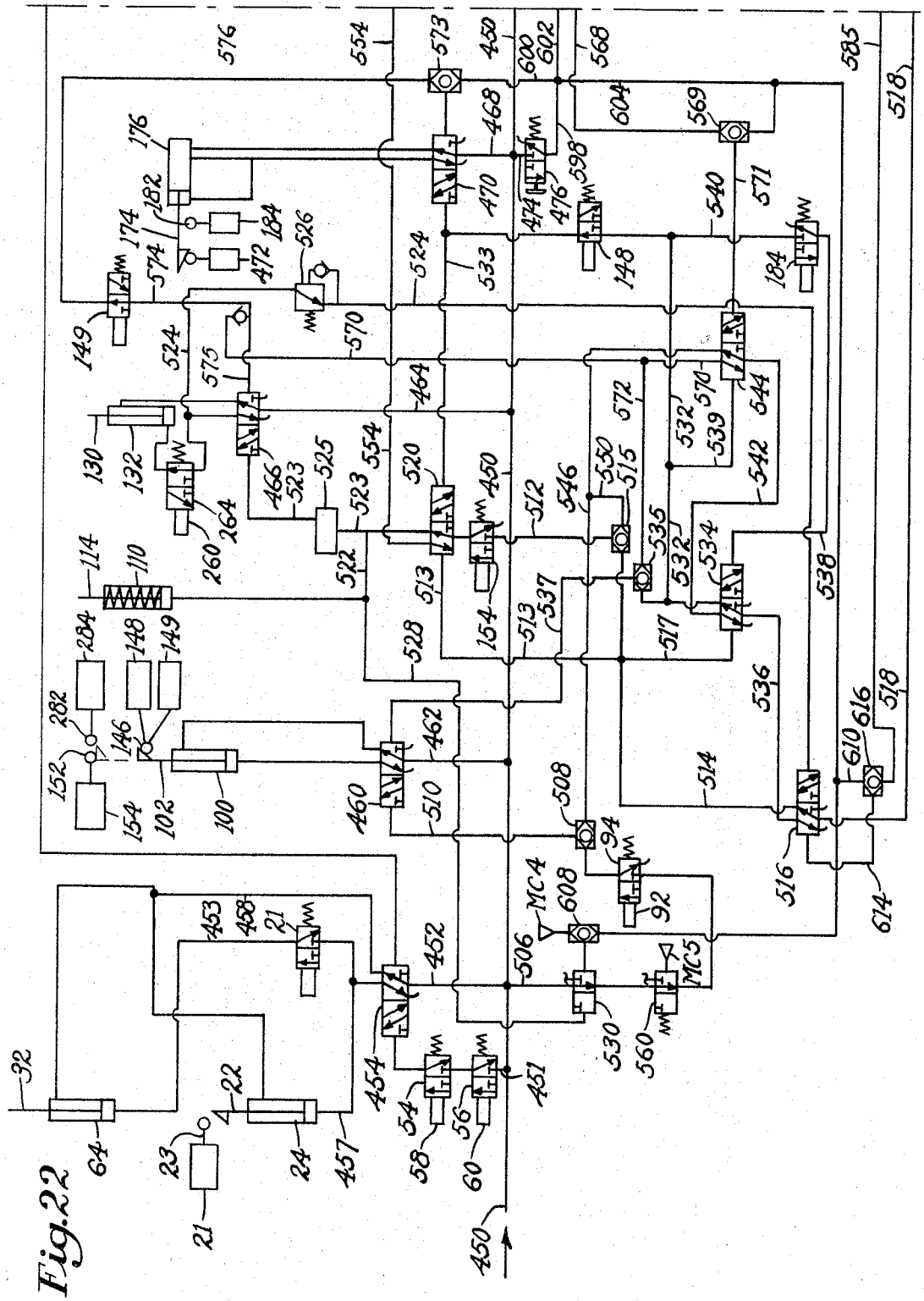
FIGS. 22 and 23 are diagrams of the pneumatic circuit utilized by the shoe handling means.
Figure 23:
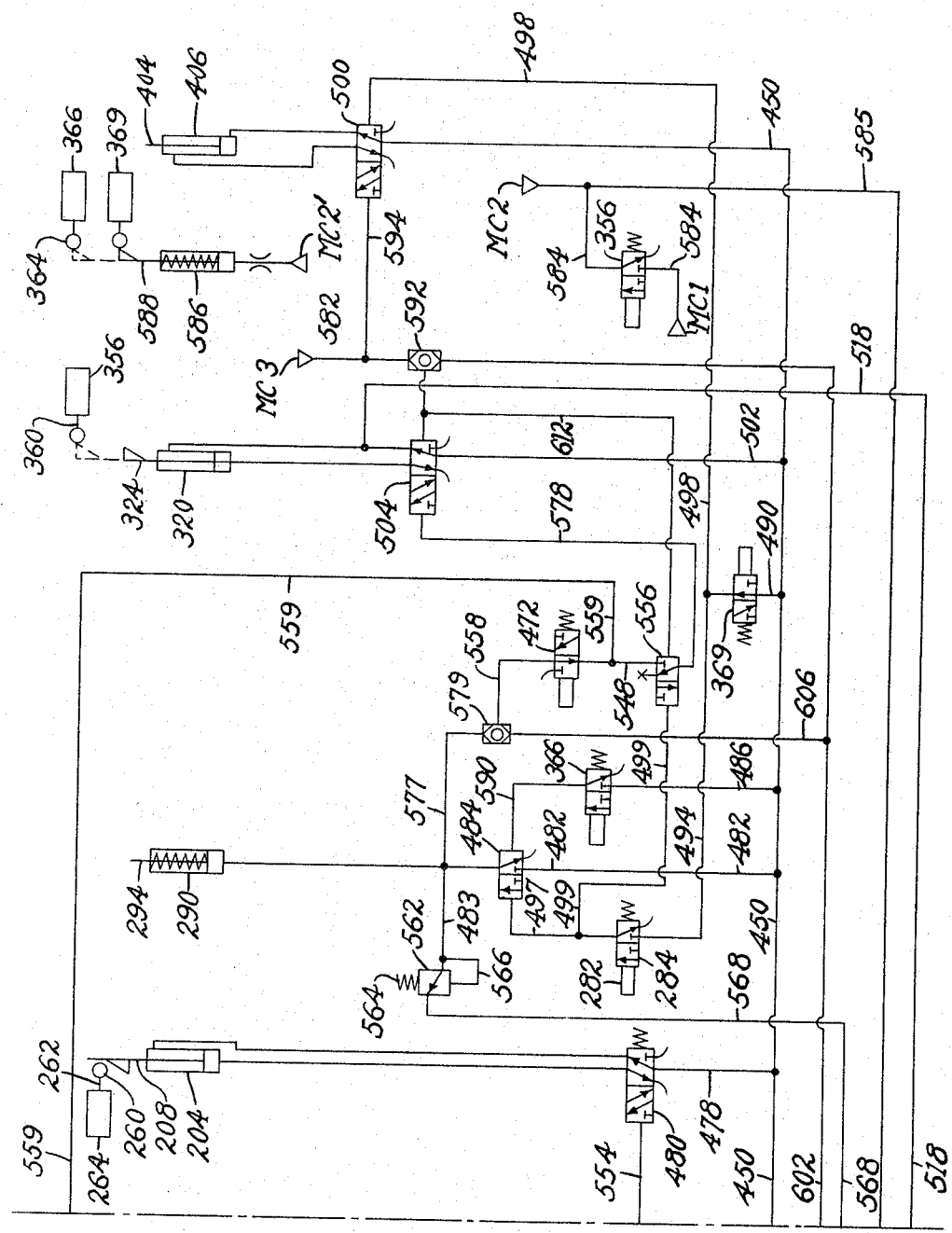

Referring to FIGS. 22 and 23, the pneumatic circuit of the machine will now be described.

Air under pressure in a main air line 450 is directed through an air line 451 to the air switch 56 (FIG. 22). Through an air line 452 air is directed from the main air line 450 to a gate 4-way valve 454. The gate valve 454 allows the air from the line 452 to pass to an air line 458 whence air enters the rod end of the lift cylinder 64 to hold the post 32 in the down position, as shown in FIG. 5. Air from the line 458 also travels to the rod end of the stop cylinder 24 so as to urge the rod 22 downwardly and thereby the stop member 12 upwardly, as shown in FIG. 5. The head end of the lift cylinder 64 exhausts through an air line 453 and through a lift valve 21. The head end of the stop cylinder 24 exhausts through an air line 457 and the gate valve 454. The lift valve 21 is held in the position shown by spring pressure.

Through an air line 462 main air is directed to a gripper positioning 4-way valve 460 and from that valve air is directed to the rod end of the shoe gripper positioning cylinder 100 to hold the piston rod 102 in the position shown in FIG. 6. Air from the main air line 450 is also directed through an air line 464 to a shoe gripper 4-way valve 466 which permits the passage of air to the rod end of the shoe gripper cylinder 132. In addition, air from the main air line 450 goes through an air line 468 and through an inverter 4-way valve 470 to the head end of the inverter cylinder 176. The piston rod 174 of the cylinder 176 in its extended position engages a valve 472 (FIG. 23) to hold the valve 472 open against spring pressure. Main air is fed through an air line 474 to a manual reset valve 476 (FIG. 22). An air line 478 delivers air from the main air line 450 to a push-down 4-way valve 480 (FIG. 23) which further directs the flow of air to the rod end of the pushdown cylinder 204. From the main air line 450 air is also directed through an air line 482 to a last plate clamp valve 484 and through a line 486 to a valve 366. An air line 490 passes air to the valve 369 through an air line 494, to the valve 284 and through an air line 498 to a dump cylinder 4-way valve 500 to hold that valve in the position shown in FIG. 23. Main air flows through an air line 502 to a traverse cylinder 4-way valve 504 and thence to the rod end of the traverse cylinder 320. The main air line 450 is connected to the dump cylinder 4-way valve 500 which permits the passage of air to the head end of the dump cylinder 406.

When the plungers 58, 60 are depressed by the cams 48, 50 the air switches 54, 56 permit the flow of air from the line 451 to the gate 4-way valve 454 to shift that valve (FIG. 22). The shifting of the gate valve 454 permits air from the line 452 to enter the line 457, and exhausts the rod end of the lift cylinder 64 and the rod end of the stop cylinder 24 through the line 458. When the piston rod 22 is extended from the stop cylinder 24 it engages the lift valve 21 to shift that valve to permit air to flow through the valve 21 and the air line 453 to the head end of the lift cylinder 64. Thus, at this point in the cycle of operation the stop member 12 has lowered to prevent the passage of another shoe and the gate assembly 26 has been subsequently lifted to permit the passage of a shoe into the receiving station L.

When the shoe in the receiving station strikes the plate 74 and thereby causes depression of the plunger 92 it shifts the start valve 94 (shown in FIG. 6) which receives air through an air line 506. The start valve 94 sends air to a shuttle valve 508 which directs the air through an air line 510 to shift the gripper positioning 4-way valve 460. Shifting of the valve 460 permits air from the line 462 to enter the head end of the gripper positioning cylinder 100 and exhaust the rod end of that cylinder. As the piston rod 102 extends from the gripper positioning cylinder 100 the valves 148 and 149 are released and shift under spring pressure, and the valve 154 is actuated. Air from the main air line 450 is directed through the air line 502 (FIG. 23) and through the traverse cylinder valve 504 to an air line 518 and through a 4-way valve 516 (FIG. 22) to an air line 514, through a shuttle valve 515 to an air line 512 which is connected to the valve 154. When the valve 154 is shifted by the action of the piston rod 102 air from the line 512 passes through the valve 154 and through a pusher valve 520 to an air line 522 and thence to the head end of the pusher cylinder 110. Air from the line 514 also enters an air line 513 which maintains the pusher valve 520 in the position shown in FIG. 22. In addition, air from the line 514 enters an air line 517 to maintain a 4-way valve 534 in the position shown in FIG. 22. Air in the line 522 enters an air line 528 which is connected to a valve 530 and shifts that valve to prevent the further flow of air to the start valve 94. Air from the pusher valve 520 enters an air line 523 which is temporarily closed by a timer 525. After the pusher cylinder 110 has had time to be operated, the timer 525 opens the air line 523 to permit the passage of air to the shoe gripper 4-way valve 466 to shift the valve. Shifting of the shoe gripper 4-way valve 466 permits air in the line 464 to flow through the valve 466 and through the valve 264 into the head end of the shoe gripper cylinder 132 and to exhaust the rod end of the shoe gripper cylinder. In addition, air from the shoe gripper 4-way valve 466 enters an air line 524 in which there is located a time delay sequence valve 526 and is directed to the 4-way valve 516 to shift that valve. The valve 516 thereupon exhausts the lines 514, 513 and 517, relieving holding pressure on the pusher valve 520 and the 4-way valve 534. Shifting of the 4-way valve 516 also connects the air line 518 to an air line 536 which sends air to the valve 534. From the valve 534 air goes through a shuttle valve 535 to an air line 537 to re-set the gripper positioning 4-way valve 460 in the position shown in FIG. 22 whereupon the shoe gripper positioning cylinder 100 is reversed and the rod 102 releases the valve 154 so that it closes under spring pressure, and engages the valves 148 and 149 to reopen them against spring pressure. Thus, the shoe gripper positioning cylinder piston rod 102 returns to the lower position, causing the shoe to be raised off the receiving station.

When the valve 154 is released from the influence of the piston rod 102 it shifts under spring pressure to the position shown in FIG. 22. Shifting of the valve 154 exhausts the air lines 523 and 522 to permit the pusher cylinder piston rod 114 to return to its idle position and to permit loss of pressure holding the shoe gripper 4-way valve 466. The opening of the valve 148 now permits air from an air line 532 to proceed via an air line 533 to the inverter 4-way valve 470 to shift that valve which permits main air from the line 468 to enter the rod end of the inverter cylinder 176 causing the piston rod 174 to be drawn into the cylinder 176. Air in the line 533 also shifts the pusher valve 520. Air in the line 532 enters an line 540 and flows to the valve 184. From the line 532 air also enters an air line 539 to hold a 4-way valve 544 in the position shown.

As the piston rod 174 moves into the cylinder 176 it releases the valve 472 (FIG. 23) and engages the valve 184 (FIG. 22) causing both to shift. The valve 184 takes air from the air line 532 and the air line 540 and directs it into an air line 538 to shift the 4-way valve 534. The air lines 517 and 514 exhaust through the shifted 4-way valve 516 so that pressure on the air line 538 readily shifts the 4-way valve 534. Upon shifting, the 4-way valve 534 receives air from the line 536, 4-way valve 516, the air line 518 and the traverse cylinder valve 504 and directs the air through an air line 542 to the 4-way valve 544 which is open and permits the air to continue to air lines 546 and 550. The air in the air line 546 goes through the shuttle valve 508 and the air line 510 to shift the gripper positioning 4-way valve 460 so as to again reverse the shoe gripper positioning cylinder 100, thereby causing the shoe to be lowered. The air in the air line 550 goes through the shuttle valve 515 into the air line 512 and up to the valve 154.

When the piston rod 102 is again extended from the shoe gripper positioning cylinder 100 it again releases the valves 148 and 149 and engages the valve 154 causing those three valves to shift. In addition, when there is a shoe in the gripper means the extension of the piston rod 102 causes shifting of a valve 284. When the valve 154 is again shifted, air in the line 512 passes through the valve 154, the pusher valve 520, and an air line 554 to shift the push-down 4-way valve 480 (FIG. 23) which permits air in the line 478 to enter the head end of the push-down cylinder 204 extending the push-down cylinder piston rod 208 therefrom. Extension of the piston rod 208 causes it to engage the valve 264 (shown in circuit in FIG. 22) to shift that valve which exhausts the shoe gripper cylinder 132.

When the piston rod 102 of the shoe gripper positioning cylinder 100 engages the valve 284 that valve is shifted so as to receive air from the line 494 (FIG. 23) and from the valve 369 which is held down by the shoe machine jack assembly. The air from the line 494 goes through the valve 284 and through an air line 497 to shift the last plate clamp valve 484. When the last plate clamp valve shifts, air from the line 482 operates the last plate clamp cylinder 290 (FIG. 23) against spring pressure.

Air from the valve 284 also enters an air line 499 to shift a valve 556. Air in the line 482 also enters an air line 483 which is connected to a valve 562. The valve 562 is held closed by a spring 564 which is opposed by a pilot air line 566. Air from the air line 483 enters the pilot line 566 to open the valve 562 against the influence of the spring 564. From the valve 562 air enters an air line 568 which directs the air through a shuttle valve 569 and air line 571 to shift the 4-way valve 544. Air in the line 482 also enters an air line 577, flows through a shuttle valve 579, through the air line 558 to the valve 472. Upon shifting, the 4-way valve 544 takes air from the air line 542 and directs it through an air line 570 to an air line 572, the shuttle valve 535, and the air line 537 to shift the gripper positioning 4-way valve 460. The air in line 570 has entered an air line 574 and an air line 575. The air in the line 575 shifts the shoe gripper 4-way valve 466 back to the position shown in FIG. 22. The air in the air line 574 flows to the valve 149. Lowering of the piston rod 102 disengages the valves 154 and 284 and engages the valves 148, 149 causing a shifting of all four valves. Shifting of the valve 154 evacuates the air air line 554, permitting the valve 480 to shift under spring pressure to the position shown causing the push-down cylinder to draw in the push-down cylinder piston rod.

With the valve 149 open once again, air passes through that valve to the air line 576 and a shuttle valve 573 to shift the inverter 4-way valve 470 back to the position shown. Shifting of the inverter 4-way valve 470 exhausts the rod end of the inverter cylinder 176 and charges the head end of the inverter cylinder causing the piston rod 174 to extend, releasing the valve 184 which shifts under spring pressure and engaging the valve 472 which shifts into the position shown. When the valve 472 (FIG. 23) shifts, air from a line 558 is passed to an air line 559 and through the valve 556 to an air line 578 to shift the traverse cylinder 4-way valve 504. Air in the air line 559 shifts the gate 4-way valve 454 back into the idle position, the air switches 54 and 56 having returned to their idle positions under spring pressure. Shifting of the gate valve 454 returns the stop cylinder 24 and lift cylinder 64 to their original positions. Air from the line 558 also passes through the valve 556 and an air line 578 to shift the traverse cylinder 4-way valve 504. Air in the air line 502 goes through the traverse cylinder 4-way valve 504 to the head end of the traverse cylinder 320 causing the traverse cylinder piston rod 224 to actuate a valve 356 which is thereby shifted.

Shifting of the valve 356 permits air from the shoe machine pneumatic circuit MC1 to pass through an air line 584 and through a portion of the shoe machine circuit MC2–MC2' to the shoe machine jack cylinder 586. In addition, air from the heeler circuit MC1 enters an air line 585 and is passed through a shuttle valve 616 to an air line 614 to shift the 4-way valve 516 back to the position shown in FIG. 22 which then opens flow to the air lines 514, 513 and 517 to shift the valves 520 and 534 back to the positions shown. Shifting of the valve 534 passes air to the lines 532 and 539 to shift the valve 544. Air in the head end of the shoe machine jack cylinder 586 causes extension of a jack piston rod 588 carrying the jack J which releases the valve 369 and engages the valve 366 causing both of those valves to shift. Shifting of the valve 369 exhausts the air line 498 relieving holding pressure on the dump cylinder 4-way valve 500. Shifting of the valve 366 sends air from the air line 486 through an air line 590 to shift the last plate clamp valve 484 back to the position shown in FIG. 23 thereby exhausing the last plate clamp cylinder 290.

While the jack is in the raised position a portion of its pneumatic circuit MC3 sends air through an air line 582 and a shuttle valve 592 to shift the traverse cylinder 4-way valve 504 back to the position shown. Air from the air line 582 also enters an air line 594 and shifts the dump cylinder 4-way valve 500. Shifting of the dump cylinder 4-way valve 500 sends air from the air line 450 to the rod end of the dump cylinder 406 and exhausts the head end of the dump cylinder. Shifting of the valve 504 reverses the traverse cylinder, releasing the valve 356 which under spring pressure shifts back to its idle position. When the valve 356 shifts, it stops the flow of air to the shoe machine jack cylinder 586 which draws in the jack piston rod 588, releasing the valve 366 and engaging the valve 369. Air from the line 582 and the shuttle valve 592 also enters an air line 612 to shift the valve 556, the air line 499 being exhausted through the valve 284. When the valve 369 shifts, air from the line 450 enters the air line 498 and shifts the valve 500 back to the position shown, the air lines 594 and 582 being exhausted through the shoe machine circuit MC3. Shifting of the valve 500 again reverses the dump cylinder 406. Signals from portions of the shoemaking machine pneumatic circuit MC4, MC5 open valves 530 and 560 to permit air to flow from the air line 506 to the start valve 94.

Manual shifting of the cycle reset valve 476 sends air through an air line 598 to air lines 600, 602 and 604. Air in the line 600 flows through the shuttle valve 573 to position the inverter cylinder 4-way valve 470 so as to put the inverter cylinder in idle condition. Air in the line 602 goes through a line 606 and the shuttle valve 579 up to the valve 472, and through the shuttle valve 592 to position the traverse cylinder 4-way valve 504 whereby to place the traverse cylinder 320 in idle condition. Air in the line 604 goes through the shuttle valve 569 and the air line 571 to shift the 4-way valve 544. Air in the line 604 also goes through a shuttle valve 608 to insure the positioning of the valve 530. In addition, from the line 604 air enters a line 610 and through a shuttle valve 616 enters an air line 614, the air in 614 serving to shift the 4-way valve 516 to the position shown which in turn sends air through the lines 514 and 517 to shift the 4-way valve 534 back to the position shown, and through the lines 514 and 513 to shift the pusher valve 520 back to the position shown. In the normal operation of the machine, it is not necessary to operate the cycle reset valve.

The pneumatic circuit of the device includes many restrictors, pressure reducers, regulators, gages and the like which, for the sake of clarity and brevity, have not been shown or discussed.

In the operation of the device, the operator merely connects the circuit shown in FIGS. 22, 23 to a source of pressurized air and energizes the motor E. The device is then ready for completely automatic operation. Lasted uppers move toward the shoe making machine M on the moving belt 2. A shoe passes under the upraised stop member 12 and engages first one and then the other, swing plates 36, 38. Movement of the swing plates 36, 38 is transmitted through the swing bars 28, 30 to the cam members 48, 50 which open the valves 54, 56. When both valves 54, 56 have been opened, the stop cylinder 24 (FIG. 5) extends the stop cylinder piston rod 22 which causes the stop member 12 to move into an obstructing position across the delivery belt 2. Lowering of the stop member 12 operates the valve 21 which causes the gate lift cylinder 64 to extend its piston rod 32 causing a lifting of the gate assembly 26. Upon raising of the gate assembly 26, the shoe is free to pass into the receiving station L.

Figure 14:
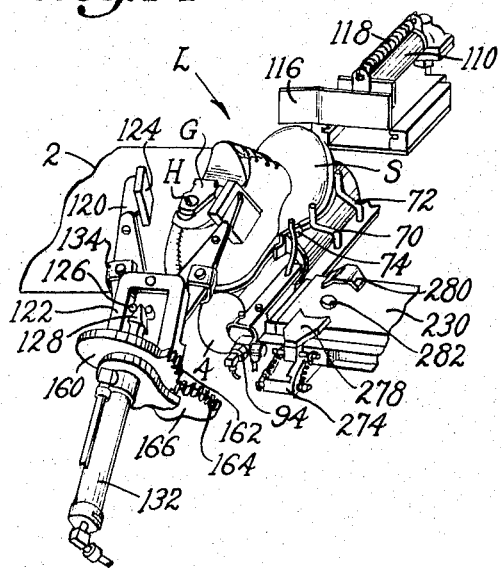
FIGS. 14–21 show in sequence the operation of the gripper and dump means.
Figure 15:
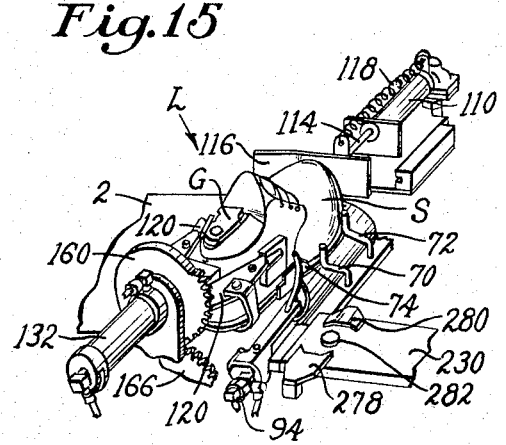

Referring to FIGS. 14–21, the movement of the shoe in the receiving station is stopped when the shoe contacts the fingers 70, 72 and the plate 74 (FIG. 14). When the shoe engages the plate 74 the cam rod 80 (FIG. 6) is caused to rotate. The rotational movement of the rod 80 is transmitted to the cam member 90 which thereby actuates the start valve 94. Opening of the start valve 94 causes the gripper positioning cylinder 100 to extend the gripper positioning piston rod 102 thereby pivoting the gripper bracket 104 upon the frame member 106 so as to lower the gripper assembly 108 into position for receiving the shoe in the receiving station (FIG. 15). As the piston rod 102 is extended it releases the valves 148, 149 and engages the plunger 152 of the valve 154.

Figure 16:
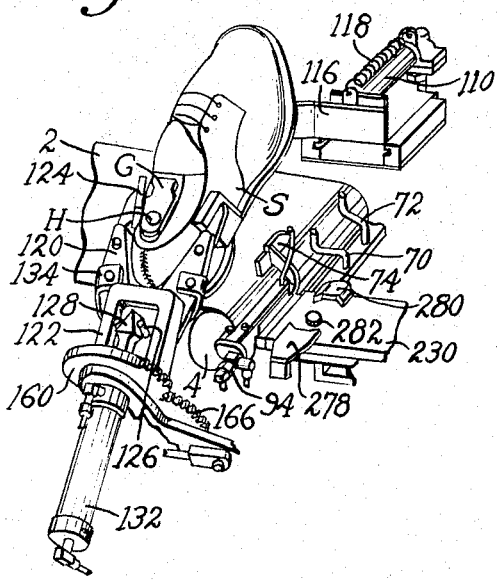
Figure 17:
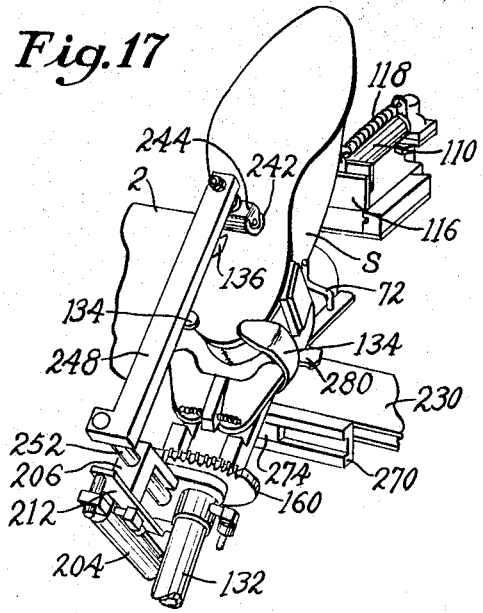
Figure 18:
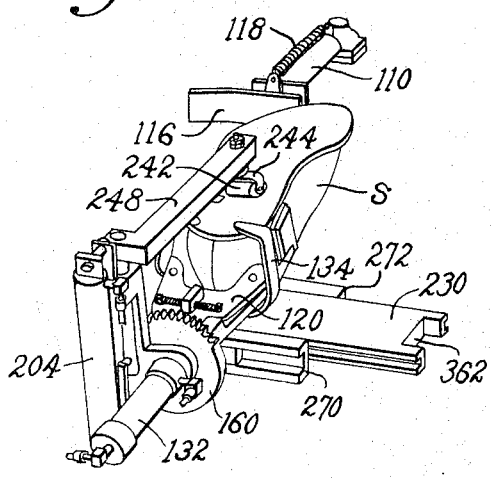

The pusher cylinder piston rod 114 (FIG. 4) is extended, contacting the toe of the shoe and pushing the shoe across the belt into the gripper jaws 120 (FIG. 15). The gripper cylinder 132 then extends its piston rod 130 which moves the wedge-cam member 128 between the upright pins 126 of the gripper jaws 120 to cause the gripper jaws to close about the heel of the shoe. The gripper positioning cylinder 100 then draws in the piston rod 104 causing the gripper assembly 108 to be reset above the receiving station L (FIG. 16). As the piston rod 102 is drawn into the cylinder 100 the valve 154 is released and the valves 148, 149 are actuated. At this point the inverter cylinder 176 (FIG. 7) draws in the inverter cylinder piston rod 174 which pivots the lever 170 about the axis 172 of the stationary disc 166. The disc 160, rotatably mounted on the free end of the lever 170, walks about the periphery of the disc 166, causing the gripper assembly, and the shoe held therein, to be inverted (FIG. 17). Drawing in of the inverter piston rod 174 causes the lug 180 to actuate the valve 184 which causes the gripper positioning cylinder 100 to again extend its piston rod 102 so as to move the gripper assembly 108, and the shoe, back to the lower position (FIG. 18).

During the movement of the disc 160 about the periphery of the disc 166, the block 188 and the push-down cylinder bracket 206 move with the lever 170. The lug 190 moves over the cam member 194 so as to cause the push-down arm 248 to move into position over the upfacing sole of the shoe S. The push-down cylinder then extends its piston rod 208, causing movement of the push-down link 212 and, through the interconnecting pin 256, like movement of the shaft 252 which carries the push-down arm 248. The roller 242 engages the sole of the shoe and urges it down against the button 282 (FIG. 4) on the table 230 (FIG. 18).

Figure 19:
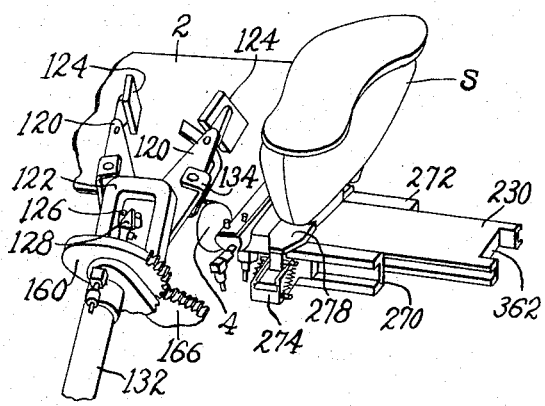

Movement of the push-down arm 248 causes the contact plate 258 to actuate the valve 264 which causes the shoe gripper cylinder to draw in its piston rod, thereby disengaging the gripper jaws 120 from the shoe S. When the shoe is pressed against the button 282, the valve 284 is opened to cause extension of the clamp cylinder piston rod 294 from the clamp cylinder 290 (FIG. 4). The last plate G is accordingly securely clamped between the clamps 278 and 280. The gripper positioning cylinder moves the gripper assembly to the upper position away from the shoe (FIG. 19). With the shoe securely held by the clamp members, the traverse cylinder 320 extends the traverse cylinder piston rod 324 to move the shoe over the table 230 to the recess 362. The face plate 358 of the traverse link 328 contacts the plunger 360 to open the valve 356 which permits air from the shoe machine circuit to enter the jack cylinder 586 and raise the jack J. During its upward movement, the jack J engages the thimble H in the last plate G and carries the shoe S into position to be operated upon by the shoe machine M. As the jack raises it actuates the valve 366 to cause the clamps 278, 280 to release their holding of the last plate. A signal from the shoe machine circuit causes the dump cylinder 406 to draw in its piston rod 404 to place the dump means in the position shown in FIGS. 11, 12 and 20.

Figure 20:
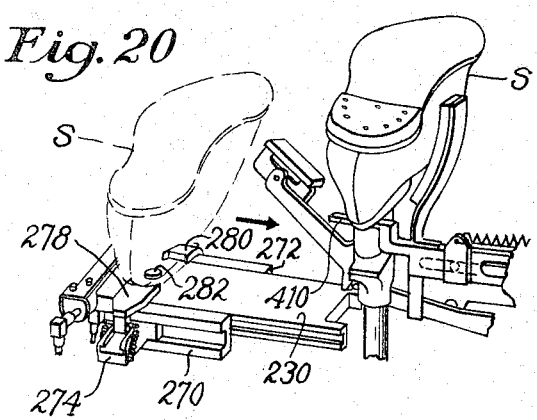
Figure 21:
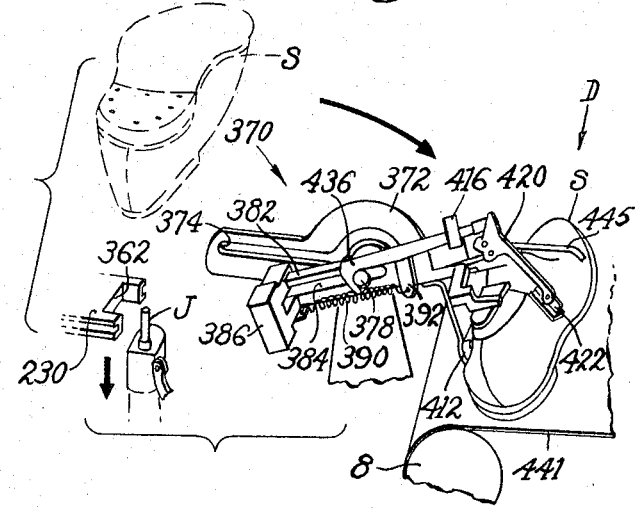

When the shoe machine M has completed its operation, the jack is lowered and the shoe S is intercepted by the plate 410 and the rigid wire 445 (FIGS. 11 and 20). As the jack is lowered, it engages the valve 369 which causes the dump cylinder 406 to extend the dump cylinder piston rod 404 which operates the dump means 370 to carry the shoe S from the position shown in phantom in FIG. 21 to the position shown in full lines in FIG. 21. Upon reaching the latter position the end member 420 is caused to release the shoe, allowing it to fall a short distance onto the discharge station D comprising one end of the conveyor belt 441.

Although the shoe handling means here described has been illustrated in connection with a heel attaching machine the device is readily adaptable for use with other automatic machines utilizing a jack. Other machines with which this device may be used include welt butters, levelers, roughing machines, heel trimmers, heel scourers, and the like.

Having thus described my invention, what I claim as new and desire to secure by Letters Patent of the United States is:

1. An automatic shoe handling means for use in connection with a shoemaking machine having a jack for engaging a last with a shoe mounted thereon, said shoe handling means comprising a receiving station adjacent said machine, conveyor belt delivery means for supporting a shoe free for movement relative thereto and delivering the shoe in random attitude to said receiving station, and automatic means responsive to the arrival of a shoe at said receiving station for transferring the shoe from said receiving station into position for engagement with said jack.

2. An automatic shoe handling means for use in connection with a shoemaking machine having a jack for engaging a last with a shoe mounted thereon, said shoe handling means comprising a receiving station adjacent said machine, conveyor belt delivery means for supporting a shoe free for movement relative thereto and delivering the shoe in random attitude to said receiving station, means at the entrance of said receiving station for orienting a shoe on said delivery means entering said receiving station, and means for transferring the shoe from said receiving station into position for engagement with said jack.

3. An automatic shoe handling means for use in connection with a shoemaking machine having a jack for engaging a last with a shoe mounted thereon, said shoe handling means comprising a receiving station adjacent said machine, conveyor belt delivery means for supporting a shoe free for movement relative thereto and delivering the shoe in random attitude to said receiving station, means at the entrance of said receiving station for orienting a shoe on said delivery means entering said receiving station, and means responsive to the arrival of a shoe at said receiving station for transferring the shoe from said receiving station into position for engagement with said jack.

4. An automatic shoe handling means for use in connection with a shoemaking machine having a jack for engaging a last with a shoe mounted thereon, said shoe handling means comprising a receiving station adjacent said machine, conveyor belt delivery means for supporting a shoe free for movement relative thereon and delivery the shoe in random attitude to said receiving station, means at the entrance of said receiving station for orienting a shoe on said delivery means entering said receiving station, means for insuring that only one shoe at a time enters said receiving station, and means responsive to the arrival of the shoe at said receiving station for transferring the shoe from said receiving station into position for engagement with said jack.

5. An automatic shoe handling means for use in connection with a shoemaking machine having a jack for engaging a last with a shoe mounted thereon, said shoe handling means comprising a receiving station adjacent said machine in random attitude, means for delivering a shoe to said receiving station, gate means at the entrance of said receiving station for controlling the attitude of the shoe entering said receiving station, means for transferring the shoe from said receiving station into position for engagement with said jack, and means responsive to the completion of the operation of said shoe machine for removing the shoe from said jack and depositing it at a discharge station adjacent said machine.

6. An automatic shoe handling means for use in connection with a shoemaking machine having a jack for engaging a last with a shoe mounted thereon, said shoe handling means comprising a receiving station adjacent said machine, means for delivering shoes to said receiving station in random attitude, gate means at the entrance of said receiving station for controlling the attitude of a shoe entering said receiving station, means for insuring that only one shoe at a time enters said receiving station, means responsive to the arrival of the shoe at said receiving station for transferring the shoe from said receiving station into position for engagement with said jack, and means responsive to the completion of the operation of said shoe machine for removing the shoe from said jack and depositing the shoe at a discharge station adjacent said machine.

7. An automatic shoe handling device for use in connection with a shoemaking machine having a jack for engaging a last with a shoe mounted thereon, said shoe handling device comprising a receiving station adjacent said machine for receiving a shoe to be operated upon, gripper means for transferring the shoe from a right-side up position at said receiving station to an inverted position for receiving the jack, and means responsive to the completion of the operation of the shoe machine for removing the shoe from said jack and depositing the shoe at a discharge station adjacent the machine.

8. An automatic shoe handling device for use in connection with a shoemaking machine having a jack for engaging a last with a shoe mounted thereon, said shoe handling device comprising a receiving station adjacent said machine for receiving a shoe to be operated upon, said receiving station comprising the downstream end of a conveyor belt, gripper means for gripping the shoe and lifting it off said conveyor belt and inverting the shoe for engagement with said jack, and dump means responsive to the completion of the operation of said shoe machine for removing the shoe from said jack and depositing the shoe at a discharge station adjacent said machine.

9. An automatic shoe handling device for use in connection with a shoemaking machine having a jack for engaging a last with a shoe mounted thereon, said shoe handling device comprising a conveyor belt for delivering lasted shoes from a previous station to a receiving station next to said machine, means on the machine side of said receiving station for stopping the movement of a shoe on said belt, gripper means for gripping the stopped shoe and inverting said shoe for engagement with said jack, dump means responsive to the completion of the operation of said machine for removing the shoe from said jack and depositing the shoe right-side up at a discharge station, and a second conveyor belt for moving the shoe from said discharge station to a next station in a shoe assembly line.

10. An automatic shoe handling means for use in connection with a shoemaking machine having a mounting means for receiving a last with a shoe mounted thereon, said shoe handling means comprising a receiving station adjacent said machine for receiving a shoe to be operated upon, gripper means responsive to the arrival of the shoe at said receiving station for transferring the shoe from a right-side up position at said receiving station to an inverted position for engagement with said mounting means, and means responsive to the completion of the operation of the shoe machine for removing the shoe from said mounting means and depositing the shoe at a discharge station adjacent said machine.

11. An automatic shoe handling means for use in connection with a shoemaking machine having a mounting means for receiving a last with a shoe mounted thereon, said shoe handling means comprising a receiving station adjacent said machine for receiving a shoe to be operated upon, said receiving station comprising the downstream end of a conveyor belt, gripper means responsive to the arrival of a shoe at said receiving station for gripping the shoe and lifting it off said conveyor belt, said gripper means being adapted to thereupon invert the shoe for engagement with said mounting means, and dump means responsive to the completion of the operation of said shoe machine for removing the shoe from said mounting means and depositing the shoe at a discharge station adjacent said machine.

12. An automatic shoe handling means for use in connection with a shoemaking machine having a mounting means for receiving a last with a shoe mounted thereon, said shoe handling means comprising a receiving station adjacent said machine for receiving a shoe to be operated upon, said receiving station comprising the downstream end of a conveyor belt, gate means at the entrance of said receiving station for controlling the attitude of a shoe entering said receiving station, gripping means responsive to the arrival of a shoe at said receiving station for gripping the shoe and lifting it off said conveyor belt, said gripper means being adapted to thereupon invert the shoe for engaging said mounting means, and dump means responsive to the completion of the operation of said shoe machine for removing the shoe from said mounting means and depositing said shoe at a discharge station adjacent said machine.

13. An automatic shoe handling means for use in connection with a shoemaking machine having a mounting means for receiving a last with a shoe mounted thereon, said shoe handling means comprising a receiving station adjacent said machine for receiving a shoe to be operated upon, said receiving station comprising the downstream end of a conveyor belt, stop means for insuring that only one shoe at a time enters said receiving station, gate means at the entrance of said receiving station for controlling the attitude of a shoe entering said receiving station, gripper means responsive to the arrival of a shoe at said receiving station for gripping the shoe and lifting it off said conveyor belt, said gripper means being adapted to thereupon invert said shoe for engaging said mounting means, and dump means responsive to the completion of the operation of said shoe machine for removing the shoe from said mounting means and depositing the shoe at a discharge station adjacent said machine.

14. An automatic shoe handling device for use in connection with a shoemaking machine having a jack for engaging a last with a shoe mounted thereon, said shoe handling device comprising a receiving station, automatic means for delivering a shoe to said receiving station, gripper means responsive to the arrival of a shoe at the receiving station for gripping the shoe and lifting it off the receiving station, means responsive to said lifting of said shoe for inverting said gripper means whereby to invert said shoe, means responsive to inverting said shoe for placing said shoe upon a table, clamp means for holding said shoe upon said table, means for moving said shoe and said clamp means longitudinally along said table to a jack engaging position, means for removing said shoe from said jack upon completion of the operation of the shoe machine, and means for moving said shoe to a discharge station.

15. An automatic shoe handling device for use in connection with a shoemaking machine having a jack for engaging a last with a shoe mounted thereon, said shoe handling device comprising a receiving station, gripper means responsive to the arrival of a shoe at the receiving station for gripping the shoe and lifting it off the receiving station, means responsive to said lifting of said shoe for inverting said gripper means whereby to invert said shoe, means responsive to inverting said shoe for placing said shoe upon a table, push-down means for urging the shoe into firm engagement with said table, clamp means responsive to said engagement of said shoe and said table for holding said shoe upon said table, means for moving said shoe and said clamp means to a position for engagement of said shoe with said jack of said shoemaking machine, means responsive to the movement of said jack for causing said clamp means responsive to the movement of said jack for causing said clamp means to release said shoe, and dump means for removing said shoe from said jack upon completion of the operation of said shoe machine and for transferring said shoe to a discharge station.

16. An automatic shoe handling device for use in connection with a shoemaking machine comprising conveyor belt delivery means, a receiving station comprising the downstream end of said conveyor belt, stop means upstream of said receiving station, gate means at the entrance to said receiving station, means responsive to the engagement of a shoe with said gate means for moving said stop means whereby to prevent the passage of a second shoe, means responsive to said moving of said stop means for moving said gate means whereby to permit the shoe in engagement therewith to move on said conveyor belt into said receiving station, and means responsive to the arrival of the shoe in said receiving station for moving said shoe into position for being operated upon by said shoemaking machine.

17. An automatic shoe handling means for use in connection with a shoemaking machine having a mounting means for receiving a last with a shoe mounted thereon, said shoe handling means comprising a receiving station, gripper positioning means responsive to the arrival of a shoe at the receiving station for moving a gripper means into position to grip said shoe, pusher means responsive to the positioning of the gripper means for pushing the shoe into engagement with said gripper means, means for actuating said gripper means after a time delay for gripping said shoe, means responsive to the gripping of said shoe by said gripper means for moving the shoe into position to be engaged by the shoe-making machine mounting means, and means responsive to the operation of the shoemaking machine for removing the shoe from said mounting means and transferring said shoe to a discharge station.

18. An automatic shoe handling device for use in connection with a shoemaking machine having a mounting means for engaging a last with a shoe mounted thereon, said shoe handling means comprising a receiving station, automatic means for delivering shoes to said receiving station, gate means at the entrance of said receiving station for controlling the attitude of a shoe entering said receiving station, stop means for insuring that only one shoe at a time enters said receiving station, gripper means for gripping the shoe in the receiving station, said gripper means being movable between said receiving station and a table whereby to transfer a shoe from the receiving station to the table, means responsive to engagement of the shoe and the table for transferring the shoe to a position for engaging the mounting means of the shoemaking machine, and means responsive to the completion of the operation of said shoemaking machine for removing the shoe from the jack of said machine.

19. An automatic shoe handling device for use in connection with a shoemaking machine having a mounting means for engaging a last with a shoe mounted thereon, said shoe handling device comprising a receiving station, a gripper assembly movable into said receiving station in response to the arrival of a shoe in said receiving station, pusher means responsive to the movement of said gripper assembly into said receiving station for pushing said shoe into said gripper assembly, a plurality of gripper jaws movable to effect grasping of the shoe, means for moving said gripper assembly from said receiving station to a table, means for moving said shoe along said table into a jack engaging position, and means responsive to the completion of a cycle of operation of said shoemaking machine for removing said shoe from said jack.

20. An automatic article handling means for use in connection with a machine for operating upon articles and having means for mounting an article to be operated upon, said handling means comprising a receiving station adjacent said machine for receiving an article to be operated upon, said receiving station comprising the downstream end of a conveyor belt, gripper means responsive to the arrival of an article at said receiving station for gripping the article and lifting it off the conveyor belt, means responsive to the lifting of said article for moving said gripper means whereby to move said article to a position for engagement with said mounting means, and dump means responsive to the completion of the operation of said machine for removing the article from said mounting means and depositing the article at a discharge station adjacent said machine.

References Cited
UNITED STATES PATENTS

| | | | |
|---|---|---|---|
| 1,843,231 | 2/1932 | Jorgensen | 12—1 |
| 2,903,722 | 9/1959 | McConchie et al. | 12—1 |
| 2,960,703 | 11/1960 | Dorosz | 12—1 |
| 3,024,480 | 3/1962 | Baker et al. | 12—1 |
| 3,152,345 | 10/1964 | Clark et al. | 12—127 |

PATRICK D. LAWSON, *Primary Examiner.*